United States Patent [19]
Graham et al.

[11] Patent Number: 5,572,201
[45] Date of Patent: Nov. 5, 1996

[54] ALERTING DEVICE AND SYSTEM FOR ABNORMAL SITUATIONS

[75] Inventors: Paul D. Graham, LaGrange Park; Gregory A. Sink, Homewood; Jerry L. Williams, Tinley Park, all of Ill.

[73] Assignee: Federal Signal Corporation, Oak Brook, Ill.

[21] Appl. No.: 286,624

[22] Filed: Aug. 5, 1994

[51] Int. Cl.⁶ ........................................... G08G 1/00
[52] U.S. Cl. .................. 340/902; 340/901; 340/904; 455/45
[58] Field of Search ........................... 340/901, 902, 340/904; 455/45; 246/125

[56] References Cited

U.S. PATENT DOCUMENTS

| | | | |
|---|---|---|---|
| 2,025,106 | 12/1935 | Hirshfeld | 340/905 |
| 3,293,600 | 3/1964 | Gifft | 340/901 |
| 3,371,278 | 9/1966 | Gelushia et al. | 340/902 |

(List continued on next page.)

FOREIGN PATENT DOCUMENTS

| | | |
|---|---|---|
| 263253 | 4/1988 | European Pat. Off. |
| 333194 | 9/1989 | European Pat. Off. |
| 479613 | 4/1992 | European Pat. Off. |
| 484246 | 5/1992 | European Pat. Off. |
| 495136 | 7/1992 | European Pat. Off. |
| 508369 | 10/1992 | European Pat. Off. |
| 507069 | 10/1992 | European Pat. Off. |
| 2615797 | 10/1977 | Germany. |
| 3734320 | 4/1989 | Germany. |
| 3832455 | 7/1989 | Germany. |
| 3915099 | 11/1990 | Germany. |
| 4117787 | 3/1992 | Germany. |
| 4034681 | 5/1992 | Germany. |
| 4123857 | 8/1993 | Germany. |
| 57-152215 | 9/1982 | Japan. |
| 63-136831 | 11/1986 | Japan. |
| 64-44630 | 8/1987 | Japan. |
| 64-81531 | 9/1987 | Japan. |
| 1-130630 | 11/1987 | Japan. |
| 63-136832 | 6/1988 | Japan. |
| 1-259639 | 10/1989 | Japan. |
| 2-213229 | 4/1990 | Japan. |
| 2-10712 | 7/1990 | Japan. |
| 3-106129 | 5/1991 | Japan. |
| 3-148924 | 6/1991 | Japan. |
| 3-188716 | 8/1991 | Japan. |
| 3-212029 | 9/1991 | Japan. |
| 4-126415 | 4/1992 | Japan. |
| 4-144414 | 5/1992 | Japan. |
| 4-144413 | 5/1992 | Japan. |
| 4-140911 | 5/1992 | Japan. |
| 2027481 | 3/1990 | Spain. |
| 664639 | 3/1988 | Switzerland. |
| 944128 | 7/1982 | U.S.S.R.. |
| 90/07237 | 6/1990 | WIPO. |

OTHER PUBLICATIONS

Brochure entitled "Feasibility Study of In-Vehicle Warning Systems", prepared by U.S. Department of Transportation, National Highway Traffic Safety Administration, Washington, D.C. 20590, May 1975.

(List continued on next page.)

*Primary Examiner*—Jeffery Hofsass
*Assistant Examiner*—Daryl Pope
*Attorney, Agent, or Firm*—Leydig, Voit & Mayer, Ltd.

[57] ABSTRACT

A warning system for alerting a person to an emergency situation which includes a transmitter responsive to a visual or acoustic alerting system for transmitting an alarm signal on an RF carrier and a control signal on a sideband of the carrier. A tuneable receiver for receiving commercial broadcasts in a normal operating mode transfers to an emergency mode upon detection of the control signal and converts the alarm signal to an acoustic signal. In one embodiment, the visual or acoustic alerting system is a siren and light system of an emergency vehicle. In this embodiment, a transceiver is preferably included for dedicated communications among emergency vehicles. The range of both the transmitter and transceiver complement and are substantially the same as the effective range of the visual or acoustic alerting system.

30 Claims, 10 Drawing Sheets

U.S. PATENT DOCUMENTS

| | | | |
|---|---|---|---|
| 3,673,560 | 7/1972 | Barsh et al. | 340/901 |
| 3,758,775 | 9/1973 | Hopkins | 246/125 |
| 3,784,970 | 1/1974 | Simpkin | 340/902 |
| 3,854,119 | 12/1974 | Friedman et al. | 340/902 |
| 3,997,868 | 12/1976 | Ribnick et al. | 340/902 |
| 4,093,161 | 6/1978 | Auer, Jr. | 246/5 |
| 4,108,405 | 8/1978 | Gibson | 246/125 |
| 4,130,801 | 12/1978 | Prygoff | 455/3.2 |
| 4,238,778 | 12/1980 | Ohsumi | 340/903 |
| 4,241,326 | 12/1980 | Odom | 340/333 |
| 4,379,947 | 4/1983 | Warner | 370/122 |
| 4,403,208 | 9/1983 | Hodgson et al. | 340/902 |
| 4,417,349 | 11/1983 | Hills et al. | 375/296 |
| 4,443,790 | 4/1984 | Bishop | 340/539 |
| 4,493,027 | 1/1985 | Katz et al. | 395/375 |
| 4,511,887 | 4/1985 | Fiore | 340/539 |
| 4,517,562 | 5/1985 | Martinez | 340/825.07 |
| 4,594,259 | 7/1986 | Baker et al. | 426/613 |
| 4,611,334 | 9/1986 | Engels et al. | 375/347 |
| 4,621,252 | 11/1986 | Johns et al. | 340/905 |
| 4,646,290 | 2/1987 | Hills | 370/84 |
| 4,677,434 | 6/1987 | Fascenda | 380/23 |
| 4,682,334 | 7/1987 | Le Mouel et al. | 371/55 |
| 4,686,672 | 8/1987 | Namiki | 370/95.3 |
| 4,706,086 | 11/1987 | Panizza | 340/902 |
| 4,764,978 | 8/1988 | Argo et al. | 340/902 |
| 4,819,025 | 4/1989 | Takahashi et al. | 355/206 |
| 4,829,558 | 5/1989 | Welsh | 379/92 |
| 4,833,481 | 5/1989 | Shibano et al. | 342/457 |
| 4,864,297 | 9/1989 | Shaw et al. | 340/902 |
| 4,887,308 | 12/1989 | Dutton | 340/902 |
| 4,890,259 | 12/1989 | Simko | 365/185 |
| 4,907,159 | 3/1990 | Mauge et al. | 364/436 |
| 4,910,794 | 3/1990 | Mahany | 455/67.4 |
| 4,942,395 | 7/1990 | Ferrari et al. | 340/907 |
| 4,952,931 | 8/1990 | Serageldin et al. | 340/902 |
| 4,977,399 | 12/1990 | Price et al. | 340/825.44 |
| 4,977,612 | 12/1990 | Wilson | 455/166.1 |
| 4,987,571 | 1/1991 | Haymond et al. | 370/85.2 |
| 4,987,605 | 1/1991 | Nose | 455/161.2 |
| 4,989,179 | 1/1991 | Simko | 365/185 |
| 4,989,263 | 1/1991 | Suzuki | 455/182.1 |
| 5,020,143 | 5/1991 | Duckeck et al. | 455/186.1 |
| 5,023,934 | 7/1991 | Wheeless | 455/45 |
| 5,045,848 | 9/1991 | Fascenda | 340/825.26 |
| 5,046,127 | 9/1991 | Luber et al. | 455/51.1 |
| 5,059,967 | 10/1991 | Roos | 342/26 |
| 5,063,610 | 11/1991 | Alwadish | 455/45 |
| 5,065,452 | 11/1991 | Duckeck et al. | 455/226.1 |
| 5,070,536 | 12/1991 | Mahany et al. | 455/67.4 |
| 5,077,827 | 12/1991 | Messerschmidt et al. | 455/1 |
| 5,095,532 | 3/1992 | Mardus | 455/186.1 |
| 5,101,510 | 3/1992 | Duckeck | 455/186.1 |
| 5,115,233 | 5/1992 | Zdunek et al. | 340/825.44 |
| 5,119,507 | 7/1992 | Mankovitz | 455/154.1 |
| 5,134,719 | 7/1992 | Mankovitz | 455/154.1 |
| 5,142,555 | 8/1992 | Whiteside | 375/327 |
| 5,146,612 | 9/1992 | Grosjean et al. | 455/45 |
| 5,150,070 | 9/1992 | Rinaldi et al. | 329/307 |
| 5,152,011 | 9/1992 | Schwob | 455/158.5 |
| 5,153,878 | 10/1992 | Krebs | 370/95.1 |
| 5,181,208 | 1/1993 | Duckeck | 371/40.1 |
| 5,193,213 | 3/1993 | Chon | 455/45 |
| 5,193,214 | 3/1993 | Mardus et al. | 455/54.2 |
| 5,206,641 | 4/1993 | Grant et al. | 340/905 |
| 5,214,792 | 5/1993 | Alwadish | 455/45 |
| 5,220,682 | 7/1993 | Tomohiro | 455/161.2 |
| 5,235,329 | 8/1993 | Jackson | 340/902 |
| 5,241,494 | 8/1993 | Blyth et al. | 365/45 |
| 5,296,840 | 3/1994 | Gieffers | 340/474 |
| 5,307,060 | 4/1994 | Prevulsky et al. | 340/902 |
| 5,337,082 | 8/1994 | Fredericks | 342/69 |
| 5,428,544 | 6/1995 | Shyu | 364/436 |

OTHER PUBLICATIONS

Product brochure for The Lookout® National Emergency Vehicle Warning System receiver units by the South Carolina Sheriffs' Association, three pages (undated).

1993 NERAC Inc. report entitled "Problem Solving Report RDS," identifying 73 citations from a database search and providing abstracts for each of them.

Anderson, Hilary, "Radio Talking Back," one-page article, date-stamped Jun. 7, 1993.

Minutes of the Jun. 7, 1993 meeting of National Radio Systems Committee of the National Association of Broadcasters in Rosemont, Illinois (three pages).

Information Storage Devices, Inc. product brochure (preliminary) entitled "ISD1012A/1016A/1020A Single-Chip Voice Record/Playback Devices," seven pages, Feb. 1992.

Information Storage Devices, Inc. product brochure entitled "Introduction to DAST" (Direct Analog Storage Technology), four pages, May, 1992.

Product flyer by Delco Electronics of Kokomo, Indiana for new RDS receivers available for customers "beginning in 1994" (two pages).

BMW product brochure for its Companion© roadside warning and information system available "for large-scale use by 1996," four pages (undated).

German language article entitled "Aufbau Eines Informationsverbundes," Anwendungsreife Bausteine der Industrie (Exponatebeschreibung), pp. 7–28 (undated).

German language article, "Mehr Service vom Sender — europaweit: RDS, das Radio Data System," *Hifivision* Jan. 1992, pp. 10–11 (undated).

Advertising Brochure by Denon Nippon Columbia Co. Ltd. for cassette receivers with CD changer control including RDS, four pages (undated).

"The Future of RDS Technology Report," vol. 3, Winter 1992, by RE America products, four pages.

Article entitled "What Is the Radio Broadcast Data System (RBDS)?" published by Electronic Industries Association Consumer Electronics Group, incorporating data as of May 26, 1993 (three pages).

New Product Information flyer (ELE 059308) by International Jensen Incorporated of Lincolnshire, IL for RBDS Cassette Player, one page (undated).

Two-page advertisement by Denon for Cassette Receivers with RDS and CD Changer Control, pp. 12–13 (undated).

Peters, William C., "Apparatus Warning Devices Present and Future," *Fire Engineering*, Apr. 1993, pp. 91–99.

Radio Broadcast Data System, "United States RBDS Standard", Jan. 8, 1993.

First Written Opinion of International Application No. PCT/US/09706, which is the PCT cognate of the above U.S. application, mailed May 8, 1996 based on International Search Report.

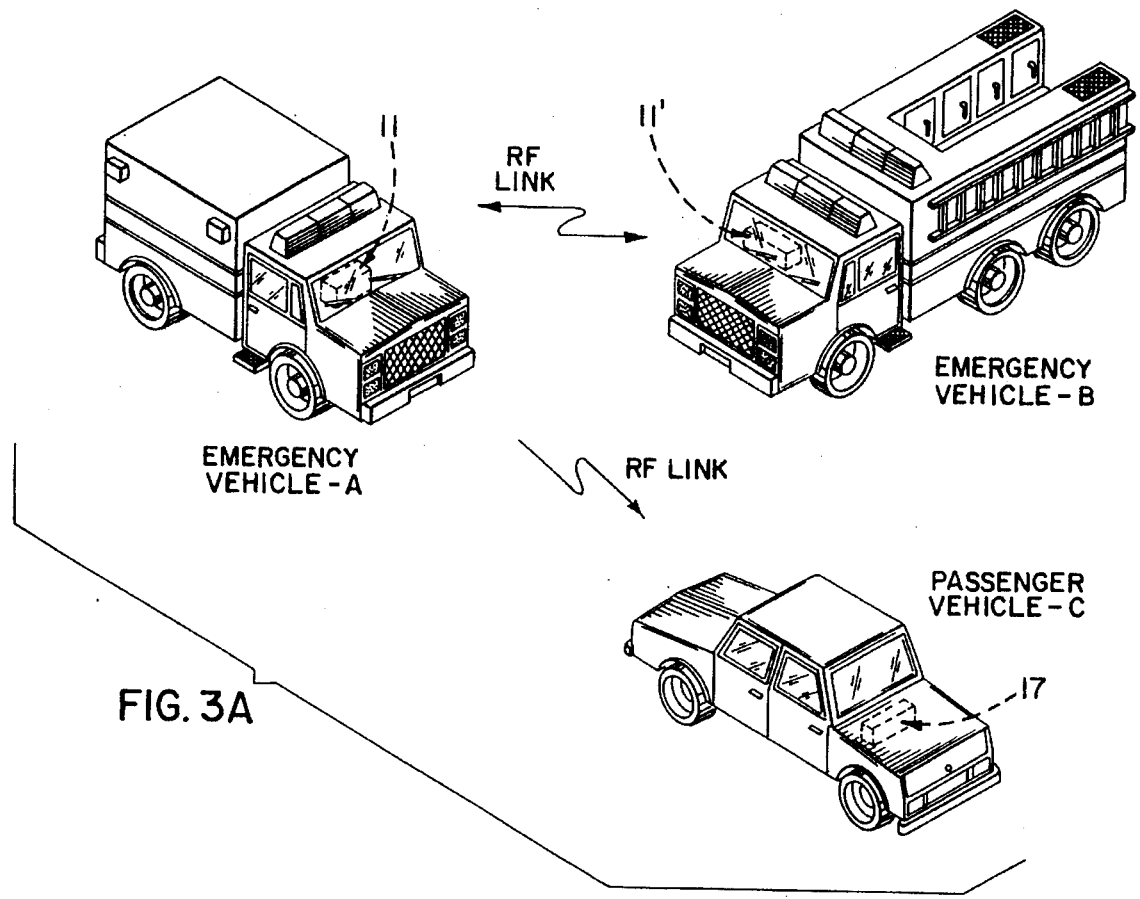
FIG. 3A
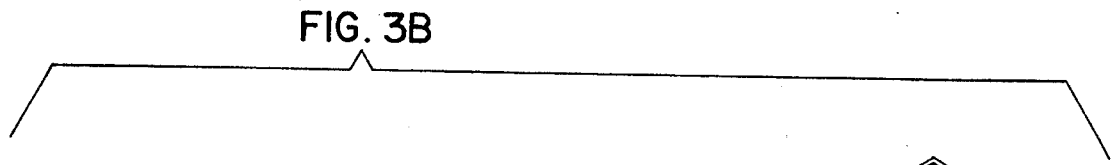
FIG. 3B
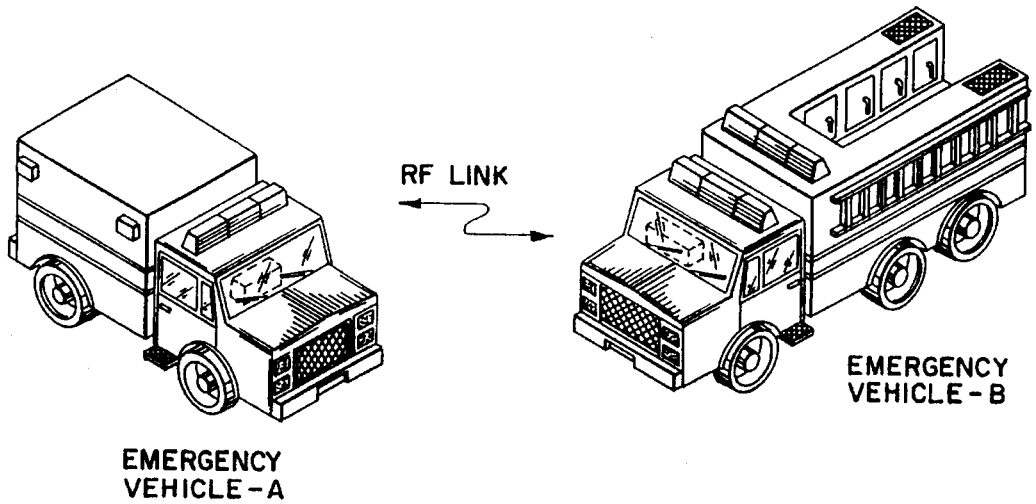

ALERTING DEVICE AND SYSTEM FOR ABNORMAL SITUATIONS

FIELD OF THE INVENTION

This invention relates to emergency warning systems and devices, and more particularly, to such systems that include an audible or visual warning device.

BACKGROUND OF THE INVENTION

Various products have been developed for alerting the general public of the presence of abnormal situations, which sometimes require action to protect life and property. These products include broad area and local area applications. In local area products, the alerting task is usually performed by a visual and/or audible signal such as flashing or rotating lights and sirens. Local area products are most commonly used with emergency vehicles. Such systems are intended to warn the public in the proximity of the vehicles. Broad area products are exemplified by the United States Emergency Broadcast System, which uses broad area RF transmitters to communicate emergency signals over a large geographic area.

In general, the alerting products broadcast light, audio or radio frequency (RF) signals. Light and audio signals attenuate relatively rapidly as they propagate relative to RF signals. This property makes alerting products that broadcast light and/or audio signals particularly appropriate for alerting only over a range of several hundred yards from the site the broadcast originates—i.e., a local area. Also, light and audio signals are directly detectable by the human senses. On the other hand, RF signals are less attenuated by the atmosphere than light and audio signals and, therefore, they are effective for providing warning signals over a broad range of several miles or more, depending on the power of the signals at the broadcast site—i.e., a broad area. Moreover, RF signals pass through most building materials without substantial attenuation, making them particularly suitable for carrying warning signals inside a home or inside other environments that isolate occupants from ambient conditions.

Even though the range of RF signals is much more dynamic than light and audio signals, RF signals have the distinct disadvantage of requiring a recipient of the signals to possess a device for converting the RF signals to signals that one or more of the recipient's five senses can detect. Typical broad area, RF-based warning systems in the past have used conventional AM/FM receivers as the device for converting the RF signal. In these systems, a commercial broadcaster agrees to use its transmitter as part of a community warning system. The transmitters used by these commercial broadcasters are typically immobile, high power devices. In the United States, a national emergency network of this type is the Emergency Broadcast System. The network consists of a number of broad area broadcasters intended to blanket the United States with an emergency RF signal that can be received by conventional receivers. These emergency broadcasts using commercial-based broadcasting systems lack flexibility and are intended to provide blanket coverage over large geographic areas.

Traditional warning products that broadcast audible and/or visual warning signals are well suited for local area application. However, they have decreasing effectiveness when those intended to receive their signals are located in an insulated environment or an environment cluttered with other audible or visual "signals"—e.g., urban areas. For example, flashing lights are only perceptible within a direct line of sight and cannot be seen around corners of buildings, which is particularly a problem in urban areas. Likewise, warning sirens cannot be heard by individuals with reduced or impaired hearing or in noisy vehicles, urban streets or well-insulated dwellings. Other factors that reduce the effectiveness of local warning systems include the use of audio systems in a vehicle, heavy traffic conditions, weather conditions forcing windows to be rolled up and the noise of forced air systems. Also, vehicle and dwellings have recently become better insulated, further enhancing the masking of audio or visual warning signals. These signal masking problems increase the likelihood that an audible or visual warning device will not be noticed in a vehicle or building.

Moreover, even though local area warning devices are used by almost all emergency vehicles, such vehicles themselves often suffer from reduced awareness of other emergency situations. For example, a fire truck traveling in an emergency mode typically generates audible and visual signals to warn the motoring public and pedestrians that the truck is operating outside the normal mode of traffic flow (e.g., high speed and contrary to lane and signal flow controls). When two or more vehicles respond to an emergency from different points of origin, they typically approach the emergency along different routes thus becoming a risk to each other. In addition to the increased risk due to travelling in abnormal modes, the emergency warning siren or warning lights of a first vehicle tend to mask the ability to perceive warning lights or sirens of other emergency vehicles.

Various proposals to overcome these problems of traditional local area warning devices have been made. Several proposals have employed equipment dedicated to transmission of local area warning signals via RF transmission links. For example, known systems have utilized a dedicated transmitter located in an emergency vehicle and similarly dedicated receivers in vehicles or locations to be warned. These systems require the installation and maintenance of RF receivers in addition to conventional RF receivers of commercial bandwidths normally found in the vehicle or in the home and, therefore, these systems have failed to gain acceptance in the marketplace. Part of the absence of widespread use of such products relates to the perceived poor cost-to-benefit ratio for dedicated receivers that take up substantial space (especially in a vehicle) and are rarely used. Moreover, when they do operate, the user may view the conventional audible and visual warnings as effective alone and, therefore, conclude the dedicated receiver provides only an incremental and unnecessary improvement.

Another problem with known local area warning systems employing RF links is the practical difficulties related to installation of additional emergency radio equipment in a vehicle. Increasingly, mounting problems arise with the downsizing of vehicle passenger compartments coupled with limitations on mounting locations of such additional equipment due to interference with air bag deployment and the like.

SUMMARY OF THE INVENTION

It is the primary aim of the present invention to provide the enhanced warning capability of prior art local area systems employing RF links without requiring dedicated receivers.

It is also a primary object of the invention to incorporate into a local area warning system conventional electronic devices available in virtually all homes and vehicles for receiving warning signals that complement local or community audible and visual warning signals. It is a related object of the invention to supplement an outdoor community warning audible signal with an additional signal that can penetrate the relatively insulated environment of a typical modern home or vehicle.

It is still another object of the invention to provide the foregoing and other objects through an improved warning system that alerts an individual to the presence of an emergency vehicle in the ambient area proximate to the vehicle or of other abnormal situations, even when the individual is located in an environment that is somewhat isolated or masked from audible and visual signals broadcast by the vehicle.

Briefly, the invention comprises a transmitter for radiating a local warning signal from a mobile site such as an emergency vehicle or from a fixed site such as a siren mounted to a tower, wherein the warning signal is transmitted on a carrier frequency $F_0$ within a tuneable bandwidth of a standard radio receiver for receiving commercial broadcasts and includes control signals in a sideband encoded in a Radio Data System (RDS) compatible format. Because the warning signal is intended to provide a local warning that complements traditional visual and audible warning signals, the power amplifier of the transmitter has a power rating to provide a transmission area whose effective range is approximately coextensive with the range of the visual and audible signals in ideal conditions.

When used with an emergency vehicle, the transmitter is preferably matched with a transceiver that provides a communication link among emergency vehicles within an area approximately the same as the area covered by the signals from the transmitter. The transceiver operates within a bandwidth different from the bandwidth of the transmitter. For example, the transmitter preferably broadcasts within the tuneable range of a standard FM receiver, whereas the transceiver may be broadcasting within a bandwidth assigned to police and other community services.

When used at a fixed site, the transmitter is typically used alone. However, keying the transmitter is usually accomplished in conjunction with a visual or audible warning signal of a conventional type. For example, most communities have a network of sirens strategically placed throughout the population in order to ensure the warning signal collectively provided by the sirens reaches everyone. At each siren or at one siren in the approximate center of a group of sirens that are commonly controlled, a transmitter according to the invention is keyed with the activation of the siren or group of sirens.

Preferably, in either of the foregoing embodiments, the warning signal is selected to be a carrier frequency $F_0$ at the high or low end of the tuneable range of a commercial FM bandwidth—i.e., 87.5 MHz to 108.0 MHz in the United States. An audible warning signal is carried on the carrier frequency $F_0$ (i.e., siren, tone or voice) and control signals are carried on a sideband frequency (SB) of the carrier frequency. The control signals are encoded in the RDS format for decoding by the receiver. Receipt of the RDS encoded control signals by a receiver causes the receiver to respond to commands decoded from the control signals, which typically results in the receiver re-tuning to the carrier frequency $F_0$ for demodulating the warning signals and delivering the warning signal to speakers connected to the receiver.

In order to ensure the receiver functions in a normal mode while at the same time maintains an ability to recognize control data on the SB frequency, the receiver includes two front ends. One front end is controlled by the user to select a desired commercial FM broadcast in a conventional manner of operating an FM receiver. A second front end either sweeps the tuneable FM bandwidth looking for control signals on any SB frequency or it is tuned to the selected emergency carrier $F_0$ and continuously monitors its SB frequency for control signals. In either architecture for the front end, reception of a control signal by the second front end causes the receiver to switch its amplification circuitry to the second front end and broadcast the warning signal carried on the frequency $F_0$. Thus, for example, the receiver may be playing music or the like in the conventional mode, which could create or enhance the isolation of the environment. Upon receipt of control signals from the emergency vehicle, the receiver changes from its conventional mode of operation to an emergency mode, providing an audible and/or visual indication that alerts the user of the receiver to the presence of an emergency situation when the user is within an area proximate the transmitter.

When used on an emergency vehicle, both the transmitter and transceiver may include an automatic gain control (AGC) that is responsive to the speed of the emergency vehicle in order to control the range of the transmitted signals in relation to the speed of the vehicle. Moreover, a further enhancement includes shaping the radiation pattern of the emergency signals broadcast by the transmitter and transceiver to direct the signals in a manner best suited for the situation. For example, if the vehicle is parked, the radiation pattern may be shaped to form two complementary lobes, one directed forwardly and the other rearwardly of the vehicle. Such a pattern would best warn approaching traffic without unnecessarily alerting the surrounding neighborhood or remote cross streets.

Finally, the transceiver on-board the emergency vehicle may include information describing the status of the vehicle for use by a receiving emergency vehicle. For example, sensors on-board the emergency vehicle may provide information regarding the speed, direction and instantaneous position of the vehicle. At the transceiver on the receiving emergency vehicle, this information can be decoded to provide a visual display of the position, direction and speed of the transmitting vehicle. For example, the display may be a simple vector arrow whose position, orientation and length on the screen is determined by the position, direction and speed data, respectively.

While the invention will be described in some detail with reference to preferred and alternative embodiments, it will be understood that it is not intended to limit the invention to such detail. On the contrary, it is intended to cover all alternatives, modifications and equivalents which fall within the spirit and scope of the invention as defined by the appended claims.

BRIEF DESCRIPTION OF THE DRAWINGS

FIGS. 3A through 3E are pictorial diagrams illustrating various applications of the invention, in which FIG. 3A is an illustration of an application of the invention wherein both the transceiver and transmitter of FIG. 1 are mounted to an emergency vehicle for broadcasting information and warning signals to both other emergency vehicles and to "civilian" vehicles, FIG. 3B is an illustration of an application of the invention wherein only the transceiver of FIG. 1 is mounted to an emergency vehicle for broadcasting information and warning signals to other like transceivers, which are typically mounted in other emergency vehicles, FIG. 3C is an illustration of an application of the invention wherein only the transmitter of FIG. 1 is mounted to an emergency vehicle for broadcasting information and warning signals to conventional FM receivers in "civilian" vehicles, FIG. 3D is an illustration of the invention wherein only the transmitter of FIG. 1 is associated with one of several exemplary stationary warning systems and it is configured to complement the conventional visual and audible warnings employed by the stationary system, and FIG. 3E is an illustration of an application of the invention to a school bus, wherein the transmitter of FIG. 1 is keyed by the unfolding of a STOP sign on the side of the bus;

DETAILED DESCRIPTION OF THE PREFERRED EMBODIMENTS

Figure 1:
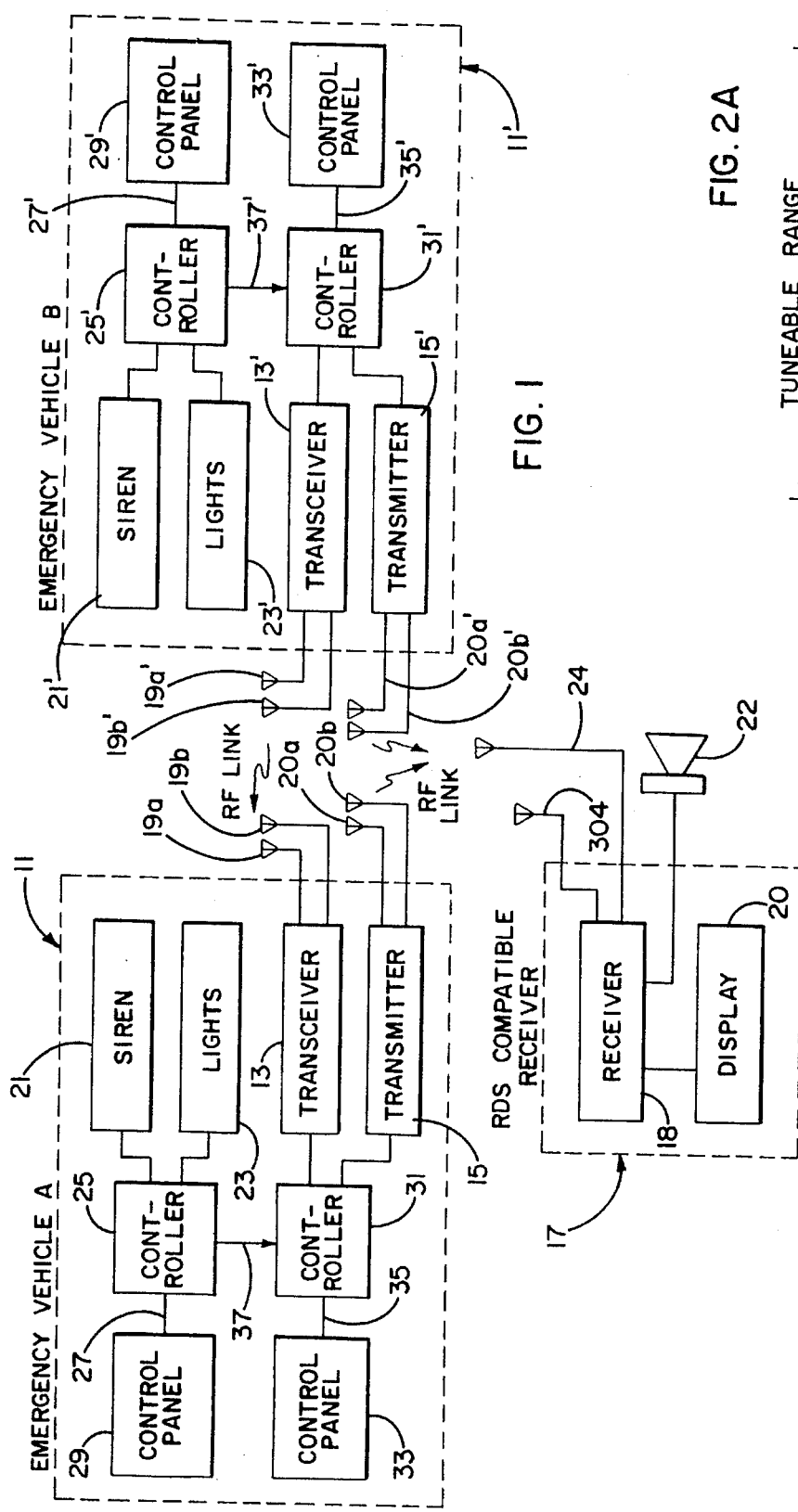
FIG. 1 is a simplified block diagram of an Emergency Vehicle System (EVS) according to one embodiment of the present invention, wherein RF communication links are established between two emergency vehicles and from the two emergency vehicles to a conventional FM receiver.

In one embodiment of the invention illustrated in FIG. 1, an alerting system 11 of the present invention is intended for use in conjunction with the conventional siren and light devices of emergency vehicles A and B (e.g., police, fire or ambulance vehicles). In an alternative embodiment, the alerting system may be utilized with stationary devices such as road signs or outdoor warning sirens, as described in greater detail hereinafter. In a further alternative embodiment, the invention contemplates applications with non-emergency vehicles such as school buses.

One particular aspect of the embodiment of FIG. 1 is the transmission and reception of emergency data between the emergency vehicles A and B over a frequency $F_1$ and the transmission of supplemental emergency data from the emergency vehicles A and B to a receiver 17 over a frequency $F_0$, the latter providing the motoring public (or those in fixed locations) with a warning of potential emergency situations. In this way, motorists in the proximate area or those in fixed locations may receive warning information from the emergency vehicles.

In accordance with one embodiment of the invention, the alerting system 11 includes a transceiver 13 located on a first emergency vehicle A for supplying RF signals at a first frequency $F_1$ to one or more other emergency vehicles B also equipped with a similar transceiver 13' to minimize the risk of collision in emergency situations. In accordance with another aspect of the invention, the alerting system also includes a transmitter 15 for transmitting an emergency RF signal at a second frequency $F_0$ to a conventional receiver 17 that receives RF signals transmitted over commercial bandwidths during its normal operation. Preferably, a sideband (SB) of this second RF signal uses the United States Radio Broadcast Data System (RBDS) Standard produced by the National Radio Systems Committee sponsored by the Electronics Industry Association (EIA) and the National Association of Broadcasters (NAB). The receiver 17 is compatible with the RBDS standard for the purpose of changing the operating mode of the receiver to an emergency mode when it receives the sideband. The details of this Standard and its implementation are set forth in the specification of the Radio Broadcast Data System published by the EIA and NAB in 1992 and entitled "United States RBDS Standard, Jan. 8, 1993." This specification is incorporated herein by reference. Of course, for use outside the United States, the standard appropriate for the country in which the system is being used should be employed—e.g., the European Radio Data System (RDS) standard established by the European Broadcasting Union. An example of such an RBDS-compatible receiver, having a single front end, is a Denon model No. DOT-950R, which is available from Denon Corporation of 222 New Road, Parsippany, N.J. 07054.

Figure 10:
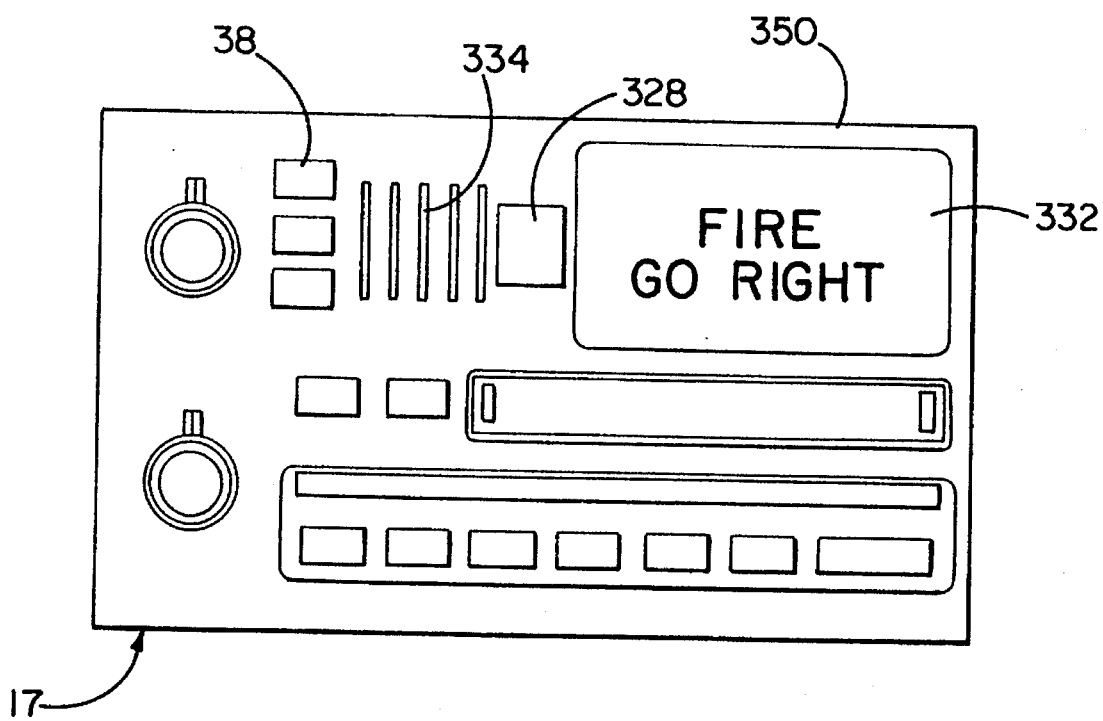
FIG. 10 is a pictorial illustration of a control panel and display for the receiver of FIG. 8.

In general, RBDS provides for transmission of digital information encoded in a sideband of a carrier frequency for a normal FM (or AM) voice and music channel. Depending on the specific hardware and software of the receiver 17 as discussed hereinafter, the digital information is decoded and either displayed on a display of the receiver 17 or interpreted as command signals for controlling the operation of the receiver. Control signals transmitted in the sideband may, for example, turn on the receiver 17 and/or tune it to other frequencies (for supplemental weather or traffic information). A front panel of an exemplary RBDS receiver 17 is shown in FIG. 10. From its outward appearance, the receiver 17 differs from conventional commercial RF receivers primarily in its larger alphanumeric display 332 and RBDS control buttons 38.

In order to transmit information according to the RBDS Standard, the digital information appears on the third harmonic (a subcarrier) of the 19 KHz "pilot tone" for stereo broadcasts in the FM band between 87.5 through 108.0 MHz. (During monophonic broadcast the frequency of the encoded subcarrier is 57 KHz.) Digital information is encoded on this subcarrier as an amplitude modulated signal and shaped by biphase coded data signals, using the differential coding scheme which follows a protocol outlined in the RBDS Standard. The power of the data signal at and close to the subcarrier is minimized by coding each source data bit as a biphase signal. There is a dual binary signal shaping filter (not shown) to shape the band limiting spectrum and timing and frequency spectrums of the biphase coded radio data signals.

Figure 6:
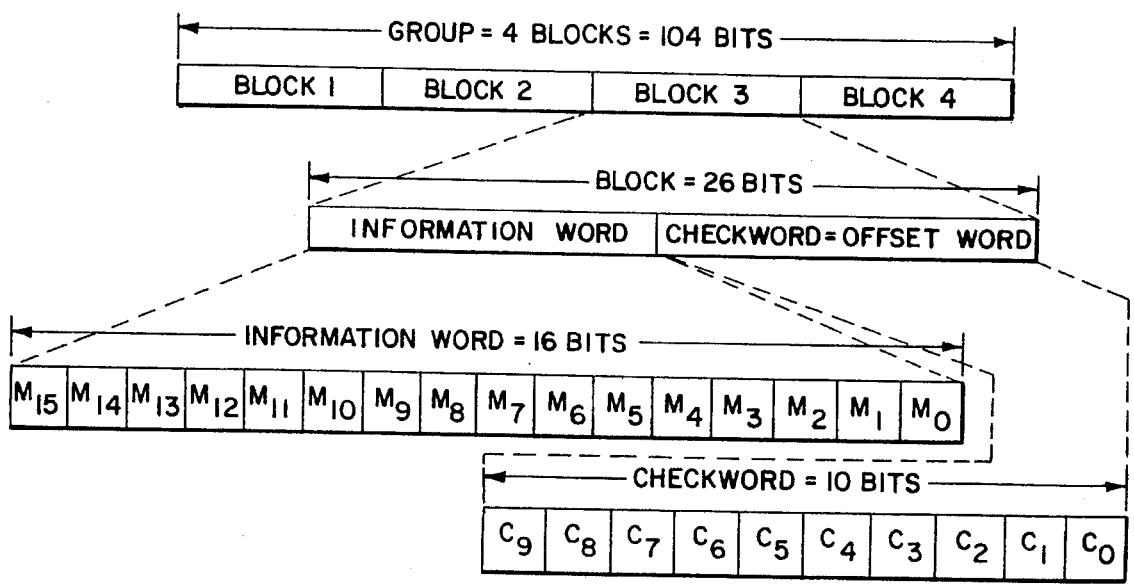
FIG. 6 is a diagram illustrating the preferred coding structure for control data broadcast on a sideband of a carrier frequency $F_0$ to which the transmitter of FIG. 1 is tuned.

The result of this frequency encoding at the transmitter 15 and subsequent frequency decoding at the receiver 17 is a stream of binary encoded data as shown in FIG. 6. The data stream is formatted into groups, where each group of data comprises 104 data bits. The 104 data bits of each group are divided into four words of 26 bits each. The first 16 bits of each word are the information word and the last 10 bits are the check bits for the word. Blocks 3 and 4 are generally used to send information to the receiver 17 to be displayed, while Blocks 1 and 2 are normally set aside to provide command or control information for receiver control.

For example, Blocks 1 and 2 may include a Program Service Code (PS code). The PS code tells the receiver 17 that Block 3 contains the call letters of the transmitting station, which should be displayed on the display 332.

In addition to displaying call letters, the RBDS standard also provides for the display 332 showing the programming format of the station—e.g., jazz, rock, classical, etc. The programming format is identified by a Program Type (PTY) code that has up to 31 categories. Categories 30 and 31 of the code are reserved in the RBDS Standard for displaying "test" (No. 30) and "alert" (No. 31) on the alphanumeric character display 332 of the receiver 17 (see FIG. 10). It is intended that this invention uses category 31 of the PTY code as part of its features as explained more fully hereinafter.

Turning to the schematic illustration in FIG. 1, each of the two emergency vehicles A and B is equipped with the alerting system 11 in accordance with one embodiment of the invention. The following is a description of the alerting system 11 of this first embodiment with reference to emergency vehicle A and the functioning of that system with the complementary alerting system mounted in the emergency vehicle B. Those skilled in the art will appreciate that although the following discussion is with reference to the alerting system 11 mounted in the emergency vehicle A, it is equally applicable to the alerting system mounted in the emergency vehicle B. Moreover, those skilled in the art will appreciate that any number of emergency vehicles equipped with the alerting system 11 can cooperate to provide emergency warning in keeping with the invention. Like devices in emergency vehicles A and B are identified by the same number. In order to distinguish between the two systems, however, the numbers identifying the alerting system and its components of vehicle B are primed—i.e., 11', 13' 15' etc The transceiver 13 of the alerting system 11 transmits radio information to and receives radio information from the alerting system 11', mounted to the emergency vehicle B via antennas 19a and 19b. In the illustrated embodiment, the transceiver 13 broadcasts on a frequency $F_1$ within the bandwidth allocated for emergency use—e.g., the police bandwidth.

In keeping with the invention, the effective range of the antennas 19a and 19b and the sensitivity of the receiver portion of the transceiver 13' in the alerting system 11', of the emergency vehicle B complement one another so that the alerting system of emergency vehicle B detects the transmitted RF signal from the alerting system of emergency vehicle A when the two vehicles are within a predetermined distance of one another—e.g., 500 yards. In this manner, the transceiver 13 or 13' of the emergency vehicle A or B, respectively, transmits signals on the frequency F, intended to alert other emergency vehicles to its presence in the proximity of those other emergency vehicles, thereby reducing the risk of a collision. In this regard, the transceiver 13 provides only local area coverage.

Figure 2A:
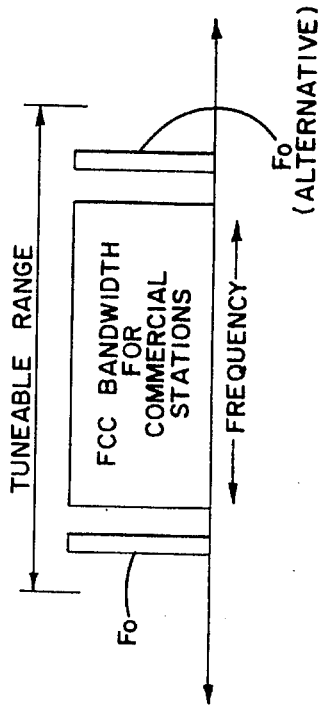
FIG. 2A is a schematic illustration of the tuneable bandwidth of the conventional FM receiver in FIG. 1, including within the bandwidth a region approved for commercial broadcasts and a region at either end of the bandwidth for broadcasting emergency signals in accordance with the invention.
Figure 2B:
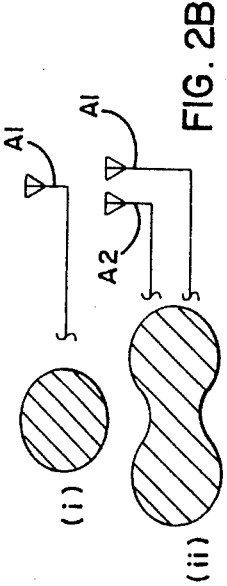
FIG. 2B is a schematic illustration of two radiation patterns broadcast by alternative antenna configurations, where the first configuration (i) provides a substantially omnidirectional pattern and the second configuration (ii) provides an oblong pattern.

Referring to FIG. 2B, a single dipole antenna A1 provides a substantially omnidirectional broadcast pattern (i). An omnidirectional pattern of the RF warning signal from the transceiver 13 may be most appropriate in open areas or at intersections in urban areas. By exciting two antennas A1 and A2 spatially separated by an appropriate distance as illustrated in FIG. 2B, an oblong pattern (ii) is provided for the radiating RF signal. This pattern may be most appropriate for the transceiver 13 in divided highway situations in order to alert only vehicles on one side of the highway. Using conventional techniques, the warning signals transmitted by the transceivers 13 and 13' may be analog or digital signals decoded by the receiving transceiver as audible or visual information.

Simultaneous transmission by multiple vehicles within range of one another may be accomplished by employing either same frequency $F_1$ or multiple frequency transmission protocols. Various techniques are known for simultaneous transmission on different frequencies. Also well known are techniques for transmitting on the same frequency $F_1$ using different time sharing protocol schemes. For example, in one technique for transmitting on different frequencies, the frequencies are selected to match the frequencies at which a scanning receiver expects information to be located. An example of a same frequency technique is the use of a packet radio technology as is known to those skilled in the art. Other examples of same frequency protocols are a time domain multiple access (TDMA) technique and a code domain multiple access technique (CDMA), both of which are known in the art of RF modulation and transmission. Other known techniques or protocols may also be appropriate for emergency vehicle-to-emergency vehicle transmission according to the invention. Further details of the foregoing techniques and protocols and additional possible alternatives can be found in the following references: *Telecommunication Engineering,* 2nd Ed. by J. Dunlop and D. G. Smith, Van Nostrin, 1987, ISBN 0-278-00082-7; *Wireless Communication Handbook,* Ed. by Gary Breed, 1992, Cardiff Publishing Co. (no ISBN Number); and *Telecommunicaion Transmission Systems,* McGraw-Hill, 1993, by Robert G. Winch, ISBN 0-07-070964-5.

Turning to the operation of the transmitter 15, it broadcasts a carrier frequency $F_0$ over a local area—e.g., a range from 100 to 500 yards. A sideband of the carrier frequency $F_0$ includes information encoded using the RBDS Standard and specifically category 31 of the PTY code, which is used in the invention to place the receiver 17 in an emergency mode. In a conventional manner, the carrier frequency Fe is frequency modulated with an audio alarm or alerting signal (e.g., voice or siren). As will be appreciated by those skilled in the art of radio transmission and reception, the transmitter 15 may alternatively transmit an amplitude modulated (AM) signal, with one of the sidebands of an AM carrier frequency $F_0'$ containing information digitally encoded using the RBDS Standard. Using conventional techniques, the carrier frequency $F_0'$ is amplitude modulated by an audio signal for alerting a receiver 17 in range of the transmitter 15.

In accordance with the invention, the frequency $F_0$ or $F_0'$ is within the tuneable range of the conventional receiver of commercial FM or AM broadcasts, respectively. As illustrated in FIG. 2A, a bandwidth approved in the United States by the Federal Communications Commission for commercial FM and AM broadcasts is less than the tuneable range of the conventional receiver 17. Preferably, the frequency $F_0$ (FM) or $F_0'$ (AM) is dedicated to the function of broadcasting emergency signals and information and, therefore, is outside the commercial bandwidth but within the tuneable range of the receiver 17. As illustrated in FIG. 2A, the frequency of $F_0$ or $F_0'$ can be either adjacent the upper or lower end of the commercial bandwidth.

Alternatively, the frequency $F_0$ or $F_0'$ could be located within the tuneable bandwidth if frequency space is available. This approach, however, would most likely necessitate the frequency $F_0$ or $F_0'$ having different values in different geographic regions since no single frequency within the bandwidth would necessarily be available in all geographic areas. The use of different values for the frequency $F_0$ or $F_0'$ does not present a design problem for the receiver 17 since one of its front ends (discussed hereinafter) may be scanning all tuneable frequencies looking for control information on a sideband. Unfortunately, however, using this alternative approach prevents the manufacturing of the transmitter 15 tuned to a single frequency value of $F_0$ or $F_0'$. Therefore, the frequency $F_0$ or $F_0'$ is preferably an out-of-band frequency whose value is fixed for all geographic areas.

Preferably, the transmitter 15 operates at the frequency $F_0$ of 87.5 (or 108.5) MHz located on the lower (or upper) ends of the FM broadcast range. In keeping with the invention, category 31 of the PTY code (i.e., the alert code) of the RBDS Standard is transmitted by the transmitter 15 to switch on and/or raise the volume of the receiver 17. As an alternative to category 31, a new category of the PTY code could be defined in the range of categories 23–29, categories which the Standard has presently reserved as spares. In addition to turning on the receiver 17 (if it is off) and adjusting the volume, the PTY alert code also switches the receiver 17 from the commercial station to which it is tuned to the fixed emergency vehicle frequency $F_0$. Alternatively, if the receiver 17 does not have the capability to perform this re-tuning function in response to the appropriate PTY code, an RBDS Traffic Announcement Identification (TA) code is transmitted and used to command the receiver 17 to switch to the frequency $F_0$. In still another embodiment of the receiver 17, the volume of the audio signal carried by the FM station presently being listened to is reduced and mixed with the emergency audio signal upon receipt of the TA code. In this embodiment, an emergency signal carried on the frequency $F_0$ is heard as a traffic announcement with the audio from the FM station to which the user is tuned in the background.

When the transmitter 15 is keyed, the broadcast signal is preferably transmitted with a range that complements the range of the audio and/or visual warning system to which the transmitter is associated. Moreover, the range of the warning signal may be varied to accommodate varying conditions. For example, in a vehicle application such as illustrated in FIG. 1, the power of the transmitter 15 and thus the range of the warning signal may be varied with vehicle speed as discussed hereinafter. In a specific embodiment, the range of the warning signal varies from a minimum of 500 feet at 0 to 15 MPH to a maximum of 2500 feet when the emergency vehicle reaches a speed of 45 MPH and higher.

In the embodiment illustrated in FIG. 1, the alerting system 11 includes a conventional device for broadcasting audio/visual signals. A conventional siren 21 and emergency lights 23 are mounted to the vehicle A. A controller 25 also of conventional type provides command signals to the siren 21 and lights 23. A bi-directional line 27 connects the controller 25 to a control panel 29 that provides a user interface for controlling the lights 23 and siren 21. An example of a suitable light device is a VISION™ warning system, manufactured by Federal Signal Corporation of University Park, Illinois. An example of a suitable siren is a SMART SIREN™, manufactured by Federal Signal Corporation of University Park, Illinois. These examples include a suitable controller and control panel in accordance with the illustrated embodiment. The VISION™ warning system and the SMART SIREN™ are described in U.S. patent application No. 08/213,266 and U.S. Pat. No. 5,296,840, respectively, which are hereby incorporated by reference.

In accordance with an important aspect of the invention as illustrated in FIG. 1, a controller 31 provides command signals for keying the transceiver 13 and transmitter 15 in response to signals from a control panel 33 by way of bi-directional line 35 or in response to signals from the controller 25 by way of a "remote" line 37. When the siren 21 and/or lights 23 are activated, a signal is delivered to the controller 31 from the controller 25 by way of the "remote" input line 37. Depending on the operating mode of the controller 31 as explained hereinafter, the controller responds to the signal on its remote input line 37 by keying the transceiver 13 and transmitter 15 for broadcasting RF alerting signals that complement the audio/visual signals of the siren 21 and the lights 23. In broadcasting the RF alerting signals, either one or both of the antennas 19a and 19b are excited, depending on the desired broadcast pattern for the transceiver 13. Likewise, either one or both of antennas 20a and 20b are excited, depending on the desired broadcast pattern for the transmitter 15.

The invention may be configured in several alternative embodiments, some of which are illustrated in FIGS. 3A through 3D. In each of the embodiments in FIGS. 3A–3C, the alerting system 11 of FIG. 1 includes one or both of the transceiver 13 and transmitter 15. For example, in FIG. 3A, the alarm system 11 and 11'in each of emergency vehicles A and B, respectively, includes both the transmitter 15 and transceiver 13 as illustrated in FIG. 1. In this embodiment, each of the emergency vehicles A and B alerts both the other emergency vehicle and the receiver 17 in the non-emergency vehicle C when they are within the range of the transceiver 13 and transmitter 15.

In the embodiment illustrated in FIG. 3B, the system on-board each of the emergency vehicles A and B includes only the transceiver 13. In this embodiment, each emergency vehicle A and B alerts only other emergency vehicles equipped with a similar type of transceiver 13.

Figure 3C:
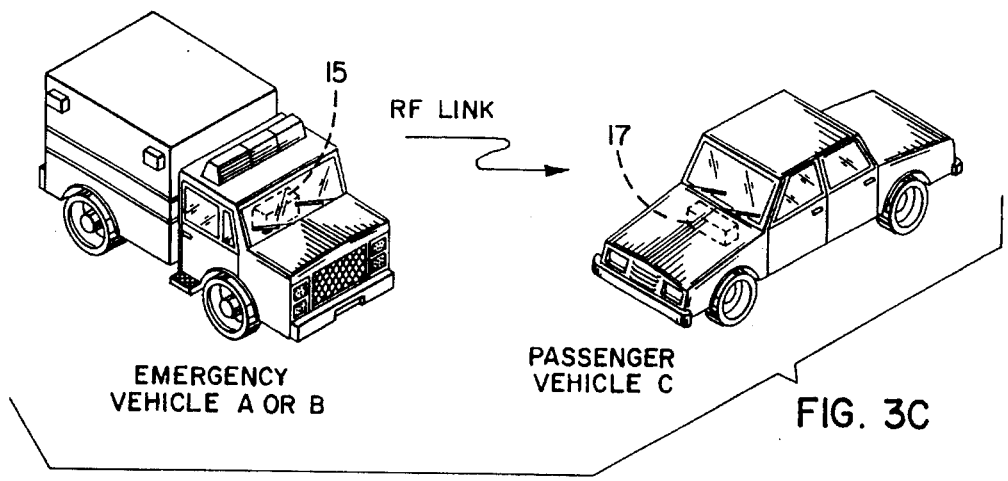

In the embodiment of FIG. 3C, the system on beard the emergency vehicle A or B includes only the transmitter 15 for alerting the passenger vehicle C having the receivers 17. In this regard, although the illustration in FIG. 3C suggests the passenger vehicle C is a non-emergency vehicle, it will be appreciated by those skilled in the art that an emergency vehicle may also be equipped with the receiver 17 and, therefore, may also receive the emergency signal broadcast by the transmitter 15. Furthermore, the receiver 17 placed at fixed sites such as residential dwellings and the like can also receive the emergency signal if the transmitter 15 is in range of the receiver.

Figure 3D:
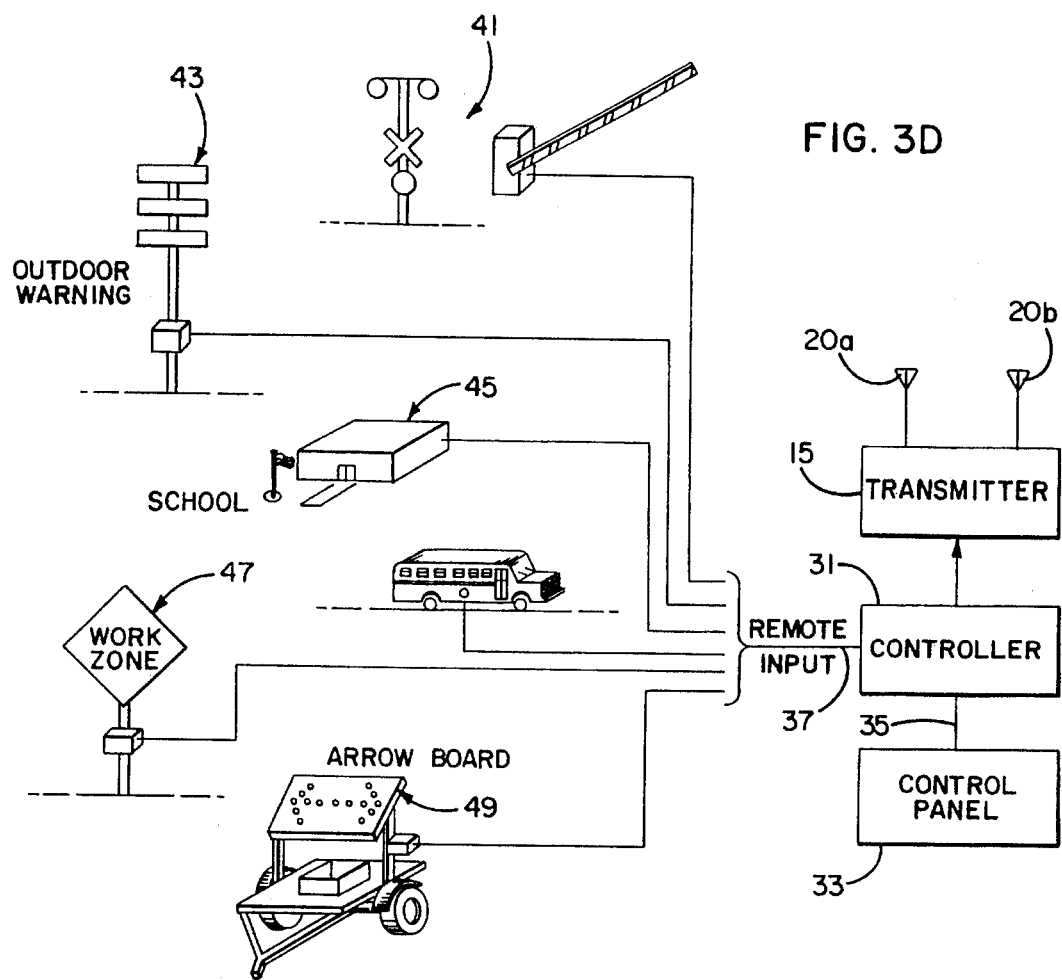

In keeping with the invention, a further embodiment of the invention is illustrated in FIG. 3D, which illustrates various fixed visual or audible alarm systems that incorporate the transmitter 15 for purposes of providing a complementary RF signal to the RDS compatible receiver 17 of FIG. 1. In these embodiments, an audio and/or visual alarm system according to the invention broadcasts from a fixed location. In keeping with the general architecture of the embodiment of FIG. 1, the embodiments of FIG. 3D include the controller 31 for keying the transmitter 15 in response to a remote activation signal from the audio and/or visual system it complements.

In general, the architecture in FIG. 3D provides for the signal activating the visual and/or audible signal to also key or activate the transmitter 15, which is physically located proximate to the audio/visual system. One example of an audio/visual system that may be mated with the transmitter 15 is a conventional railroad crossing system 41 as illustrated. Another example is a community warning siren 43 as illustrated. An example of an outdoor warning siren that may employ the RF link of the invention is disclosed in U.S. Pat. No. 5,146,508, which is hereby incorporated by reference. Yet another example is a school alarm system 45 as illustrated. The alarm system 45 includes a scheduling system for timing school bells. The system 45 cooperates with the transmitter 15 to key the transmitter during scheduled recesses and before and after classes. Permanent road signs such as the sign 47 illustrated in FIG. 3D may be coupled to the transmitter 15 in accordance with the invention to continuously transmit an RBDS signal or to transmit the signal during selected time periods in a daily, weekly or even monthly cycle. Also, portable traffic control devices such as the arrowboard 49 illustrated in FIG. 3D may employ the transmitter 15, by keying the transmitter when the arrowboard is operating. Of course, the alarm signal and RBDS codes are tailored to each embodiment.

Figure 3E:
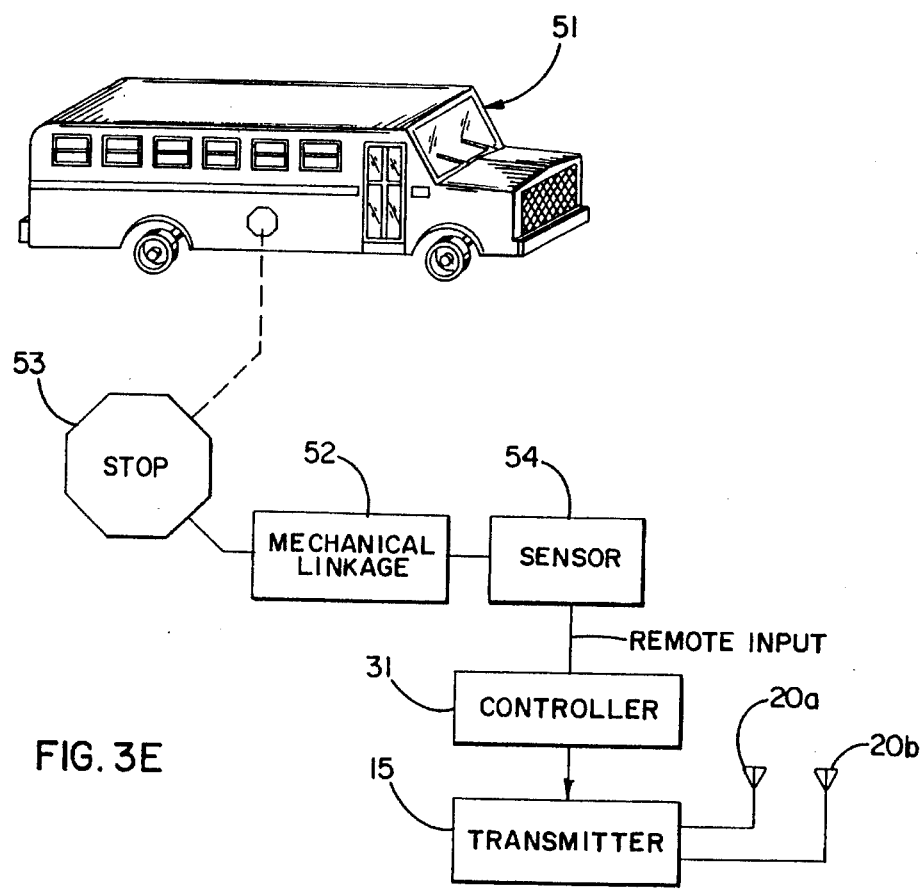

In a variation of the embodiment illustrated in FIG. 3C, the emergency vehicle A or B may instead be a school bus 51 or the like as illustrated in FIG. 3E. Instead of the transmitter 15 being keyed either manually or remotely as a result of activation of the lights 23 and/or siren 21 of the emergency vehicle, an embodiment of the invention applied to the school bus 51 automatically activates the transmitter 15 on-board the bus in response to the mechanical pivoting of a stop sign 53 hinged to the side of the bus in a well-known manner. Movement of the mechanical linkage 52 pivots the stop sign 53 from a folded position flush with the side of the bus 51 to a position extending from the bus to be visible to other vehicles. Extending the stop sign 53 also keys the transmitter 15 to broadcast an RBDS signal that is decoded by the receiver 17 in an approaching vehicle for the purpose of warning the occupants of the vehicle that they are approaching the stopped school bus 51. In the illustrated embodiment, a sensor 54 senses the movement of the mechanical linkage 52 in order to provide a signal on the remote input line 37 that causes the controller 31 to key the transmitter 15. The sensor 54 may simply be a switch ganged to the mechanical linkage 52 for unfolding the stop sign 53.

Figure 4:
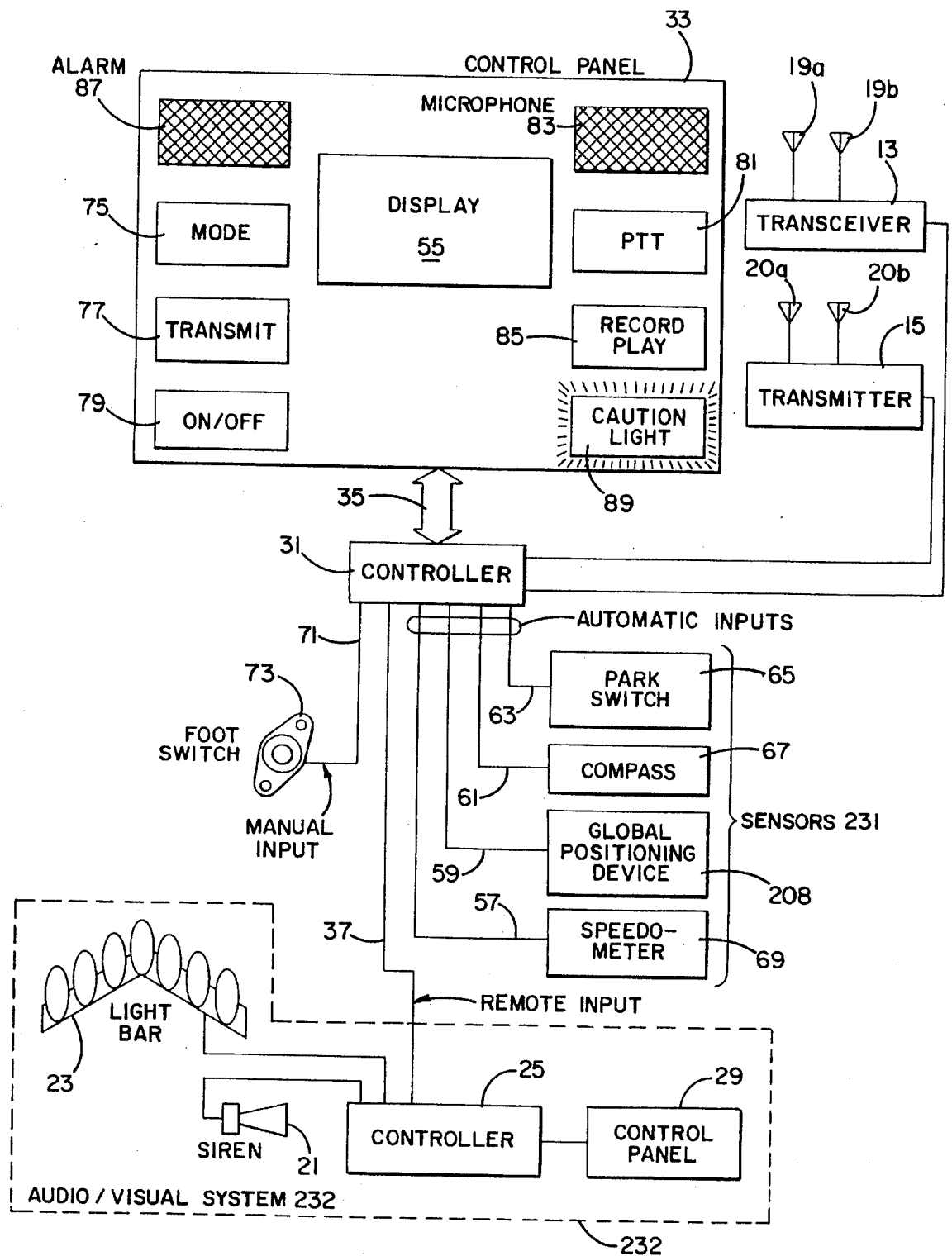
FIG. 4 is a schematic diagram of an RF system on-board one of the emergency vehicles of FIG. 1, pictorially illustrating an exemplary control panel for the transceiver and transmitter of the system plus several sensor inputs whose data are indicative of a vehicle status.

FIG. 4 illustrates a pictorial diagram of a typical control panel 33 of the system of either emergency vehicles A and B in FIG. 1. The system on-board the emergency vehicle includes the transceiver 13, the transmitter 15, the controller 31, and antennas 19a, 19b and 20a, 20b. The control panel 33 includes an alphanumeric display 55 as well as various warning or indicator lamps as described below. While the control panel 33 is preferably mounted in the driver's compartment in the emergency vehicle A or B to permit the driver to view the display 55, it alternatively may be mounted at a fixed location in accordance with the embodiments of FIG. 3D. Of course, in its simplest embodiment as suggested by FIG. 3E, the system of the invention does not include the control panel 33 and the transmitter 15 and/or transceiver 13 are keyed only through an associated conventional audio/visual alarm system.

In the embodiment of FIG. 4, the controller 31 receives remote, automatic and manual input signals for keying the transceiver 13 and transmitter 15. The remote input line 37 of FIG. 4 is from the controller 25 of the audio/visual system 232 comprising the conventional lights 23 and siren 21. The controller 31 also receives input information regarding the operating status of the vehicle from the sensors 231 via automatic input lines 57–63.

Depending on its programming, the controller 31 responds to these various inputs by keying one or both of the transceiver 13 or transmitter 15. For example, in the illustrated embodiment of FIG. 4, the controller 31 receives an input signal from the park/neutral switch 65 of the emergency vehicle via line 63, thereby providing to the controller an indication of whether the emergency vehicle is parked or moving. In accordance with its operating program as discussed more fully hereinafter, the controller 31 may change the message on RBDS frequency $F_0$ or change the broadcast pattern (see FIG. 2B) in response to a change in the status of the switch 65. The controller 31 also receives information describing the directional heading of the emergency vehicle from a compass 67. This information is encoded and transmitted to other emergency vehicles via the frequency $F_1$ broadcast by the transceiver 13. It may also be supplied to the receiver 17 via an RBDS code on the sideband of the frequency $F_0$. A change in the heading of the vehicle is detected by the controller 31 and the data broadcast by the transceiver 13 is updated.

The speed of the emergency vehicle A is monitored by the controller 31 from a speed sensor 69 in order to vary the transmitting power of the transceiver 13 and the transmitter 15 as explained hereinafter in connection with FIG. 5. This speed information is used to correlate the effective range of the transceiver 13 and the transmitter 15 with the speed of the vehicle A. The controller 31 also includes a manual activation input 71. In the illustrated embodiment as shown in FIG. 4, the manual input is connected to a foot switch 73, which allows the user of the system to key the transceiver 13 and transmitter 15 for broadcasting.

In operation, the alerting system of FIG. 4 functions in one of a plurality of alternative operating modes (e.g., eight). The operating mode can be manually selected by way of keystrokes to a switch 75 on the control panel 33. Alternatively, a change in the status of one of the automatic, remote or manual inputs causes the controller 31 to respond under program control to automatically switch to an appropriate operating mode. In order to inform the user of the present operating mode of the system, a portion of the display 55 may be dedicated to displaying a number zero (0) through seven (7). In accordance with a predetermined convention, each of the displayed numbers corresponds to one of the eight operating modes of the system 11.

Preferably, one of the operating modes is an "idle" mode, wherein neither the transmitter 15 nor the transceiver 13 is keyed and broadcasting. A second mode is a "primary" mode, which is automatically selected when the emergency vehicle is moving as detected by the controller 31 from the status of the sensors 65 and 69. A third mode is a "secondary" mode, which is automatically selected when the vehicle is stationary as also detected by the controller 31 from the status of the sensors 65 and 69. In one contemplated embodiment, the third operating mode is reserved for a custom message to be composed at the scene of an emergency.

When the system is first powered up it checks the park/neutral switch 65 to detect whether the vehicle is stationary or moving and selects the appropriate primary or secondary operating modes. The operator has the option of selecting other operating modes by pressing the mode switch 75.

Turning to the switches and displays of the control panel 33, a keystroke to a transmit (XMIT) switch 77 causes the controller 31 to key the transmitter 15 and transceiver 13, thereby manually initiating transmission of the RF message for a selected mode. In order to prompt the user regarding the condition of the switch 77, it is illuminated whenever the transmitter 15 is keyed. A second keystroke to the XMIT switch 77 will disable the transmitter 15 and transceiver 13 and turn off the illumination of the switch. An on/off switch 79 enables system power to be turned on and off from the front of the control panel 33. To prompt the user of the status of the switch 79, it is illuminated when system power is applied. A record/play switch 85 enables the system for custom message configuration. Pushing this button with no others pressed will allow playback of selected prerecorded messages. Pushing this button simultaneously with a push-to-talk (PTT) switch 81 allows a custom message to be recorded. The PTT switch 81 activates a microphone 83 for recording custom audio messages as explained more fully hereinafter. A piezoelectric alarm 87 activates when the transceiver 13 receives a warning signal from another transceiver, thereby informing the operator of the proximity of another emergency vehicle. Also, the signal from the piezoelectric alarm 87 directs the attention of the operator to the alphanumeric display 55 for additional information that may have been transmitted. As a further visual prompt, a CAUTION indicator lamp 89 flashes when the system detects a signal from another vehicle.

Figure 5:
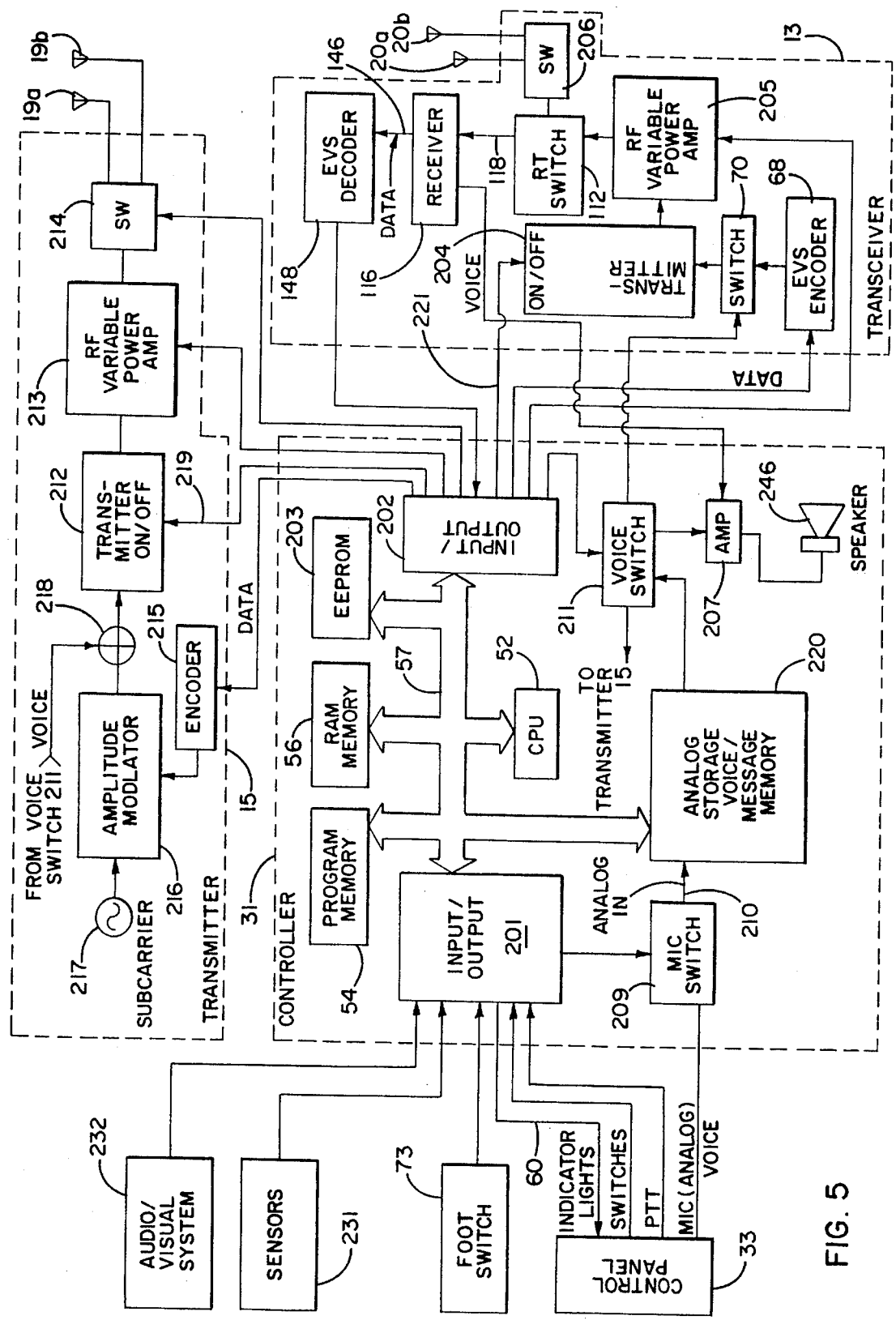
FIG. 5 is a more detailed schematic diagram of the RF system of FIGS. 1 and 4, illustrating additional details of the transceiver, transmitter and control head of the RF system.

FIG. 5 is a block diagram of the controller 31, the transmitter 15 and the transceiver 13. The controller 31 includes a microprocessor section including a central processing unit ("CPU") 52. The CPU 52 operates in a conventional fashion under the control of a program memory 54. Also, as part of its basic architecture, a RAM memory 56 communicates with the CPU 52 in a conventional manner via a bus 57. Via input/output circuitry 201, the CPU 52 receives various input signals from the audio/visual system 232, the sensors 231 and the foot switch 73 as discussed in connection with FIG. 4. In response to these inputs, the CPU 52 keys the transceiver 13 and the controller 15 in accordance with the operating modes of the controller 31. In response to receipt of digital information at the frequency $F_1$ via the transceiver 13, the CPU provides an output on a line 60 to the display 55, the piezoelectric buzzer 87 and the CAUTION indicator lamp 89 of the control panel 33. As discussed hereinafter, the transceiver 13 also drives the speaker 246 if the information at the frequency $F_1$ is in an analog format.

Input/output circuitry 202 interfaces the CPU 52 and the transceiver 13 and transmitter 15 in order for the controller 31 to key the transmitter and transceiver as well as send and receive digital data as explained more fully hereinafter. An EEPROM 203 contains a menu of messages intended for transmission via digital encoding either as an RBDS encoded signal on the sideband of the carrier frequency $F_0$ transmitted by the transmitter 15 or as a digital signal broadcast by the transceiver 13 by amplitude modulating the carrier frequency $F_1$. The menu is set forth below as TABLE I.

TABLE I

DISPLAY MESSAGE MENU

| | GROUP 1 | GROUP 2 | GROUP 3 |
|---|---|---|---|
| A | POLICE | YIELD | N-BOUND |
| B | FIRE | GO RIGHT | S-BOUND |
| C | MEDICAL | CAUTION | E-BOUND |
| D | EMS | SLOW | W-BOUND |
| E | | STOP | NE-BOUND |
| F | | GO LEFT | SE-BOUND |
| G | | WRECK | NW-BOUND |
| H | | HAZARD | SW-BOUND |
| I | | VEHICLE ID | |

In keeping with the invention, each operating mode of the system may select one of the messages from each of Groups 1, 2 and 3 of the menu. The message selected from Group 1 is transmitted by both the transceiver 13 and transmitter 15. At the receiving system 11', the selected message from Group 1 is displayed on the first line of the three (3) lines of text available on the display 55'. Likewise, at the receiver 17, the message is displayed on the first of its display's two lines of text. Preferably, in each mode of the controller 31 the transmitter 15 and transceiver 13 broadcast different messages from Group 2, which will be displayed as a second line of text in each of the receiving transceiver 13' and the receiver 17. Specifically, the CPU 52 provides to the transmitter 15 one of the messages A through H from Group 2, which is displayed as a second line of text on the display of the receiver 17. For a second line of text to be broadcast by the transceiver 13, however, the CPU selects item I from Group 2, which is an identification code of the broadcasting vehicle.

Finally, a message selected from Group 3 of the menu is also provided to the transceiver 13 by the CPU 52 for transmission. The selected message from Group 3 is displayed on the display 55' of the receiving system 11', as a third line of text. Since the display of the receiver 17 has only two lines of text, the transmitter 15 does not broadcast a message from Group 3.

In an example of a transmission of display data, the CPU may select Group i(B), Group 2(I) and Group 3(H) for transmitting via the transceiver 13 in one of the operating modes of the system 11. Obviously, the selection of the message segment from Group 3 requires periodic update, which the CPU 52 handles in a conventional way At the receiving system 11', the display 55' provides the following text:

FIRE (I.D. No. ###)

SW-BOUND

At the receiver 17, the first line of text is the same as the first line of text broadcast to the receiving system 11'. The second line of text, however, is selected by the CPU 52 from items A through H of Group 2. For example, in the foregoing example, the display at the receiver 17 may read as follows:

FIRE

GO RIGHT, assuming the CPU 52 selects item B from Group 2 for broadcasting in an RBDS format on the sideband of the carrier frequency $F_0$ broadcast by the transmitter 15.

As shown in FIG. 5, an emergency vehicle signal (EVS) encoder 68 of the transceiver receives control and message data in a digital format from the CPU 52 in order to initiate emergency vehicle-to-emergency vehicle (EV-to-EV) transmission. Any number of conventional encoding schemes may be employed by the encoder 68. The EVS encoder 68 provides an output signal to a switch 70, which also receives an analog voice signal from the memory 220 as explained more fully hereinafter.

Depending on the state of the switch 70, either digital or analog (audio) signals are passed on to the transmitter 204. The state of the switch 70 is controlled by the CPU 52, depending on whether digital data or analog voice messages are being supplied to the transceiver 13. From the transmitter 204, the modulated carrier frequency $F_1$ is delivered to a variable amplifier 205. The variable amplifier 205 includes a gain control unit circuit (not shown) under control of the CPU 52 to provide a variable gain to the signal from the transmitter 204. Specifically, the gain of the amplifier 205 varies between minimum and maximum values in a functional relationship with the speed of the vehicle as sensed by the speedometer 69. In one implementation, the CPU 52 uses a simple linear function between minimum and maximum speeds.

The amplified carrier frequency $F_1$ from the amplifier 205 is delivered to a receiver/transmit switch 112 that connects the output of the amplifier to one or both of the antennas 20a and 20b, depending on the state of switch 206. Switch 206 is controlled by CPU 52 to change the radiation pattern of the broadcast signal $F_1$. Preferably, the state of the switch 206 is determined by the operating mode of the controller 31.

When the transceiver 13 is in the receive mode, switch 112 connects the antennas 20a and 20b to an RF receiver 116. From the receiver 116, demodulated voice signals are directed to an amplifier 207 and then to a speaker 246. Demodulated digital signals are sent to a decoder 148 and then are delivered to the CPU 52 via the input/output circuitry 202. Upon receipt by the transceiver 13 of an EV-TO-EV digital signal, the controller 31 provides appropriate output signals to the display 55 of the control panel 33 to indicate receiving data being transmitted by another emergency vehicle as discussed in connection with TABLE I. At the same time, the dedicated CAUTION lamp 89 illuminates (flashes) and the piezo alarm 87 sounds indicating that another emergency vehicle signal is being received.

Preferably, the message transmitted by the transceiver 13 for reception by another vehicle is formatted to be displayed on each of the three lines of text available on the display 55. As previously indicated, the message can be divided into three sections. The first section of the message is displayed on the first line of the display 55. This section of the EV-to-EV message is the same as the message sent to the display of the receiver 17 by way of the transmitter 15. The second line of text displayed by the display 55 is the identification number or code of the transmitting vehicle. The third line of text is the direction in which the vehicle is moving. A more sophisticated display at the control panel 33 would allow full use of a global positioning device 208 illustrated in FIG. 4. Specifically, an image could be displayed representing the transmitting vehicle at a location on a display relative to a fixed central position representing the receiving vehicle. The circumferential and radial position of the image with respect to the central position would provide an easy visual reference for the user to determine the relative position of the transmitting vehicle with respect to the receiving vehicle—i.e., ahead, to the left, to the right or behind. Furthermore, the image could provide direction and speed information by being in the form of a vector. By overlaying on the display a street and highway map, a complete visualization of the transmitting vehicle's operation is obtained.

In order to transmit voice or siren signals, an analog memory 220 is addressed by the CPU 52 to output analog siren or voice messages to one or both of the transceiver 13 and transmitter 15. Preferably, the analog memory 220 is a voice record/playback device ISD1012A/1016A/1020A, manufactured by Information Storage Devices, Inc. of San Jose, Calif. The preliminary specification sheet for these devices dated February 1992 is hereby incorporated by reference. Also, U.S. Pat. Nos. 4,890,259, 4,989,179 and 5,241,494, which are directed to these devices, are hereby also incorporated by reference.

In keeping with the invention, the analog memory 220 contains a menu of voice phrases that can be assembled by the CPU 52 into an emergency message broadcast by one or both of the transceiver 13 and transmitter 15. An example of a menu of voice segments contained in the analog memory 220 and accessible by way of appropriate addressing from the CPU 52 are set forth below as TABLE II.

TABLE II

| AUDIO MESSAGE MENU | | |
|---|---|---|
| | FIRST SEGMENT | SECOND SEGMENT |
| | MOVING | |
| A | Police Approaching | Please yield right of way |
| B | Fire Approaching | Go right and stop |
| C | Ambulance Approaching | Proceed with caution |
| D | Ambulance Approaching | Slow down |
| E | | Stop now Stop now |
| F | | Please move left |
| G | | Accident ahead pass with caution |
| H | | Hazard on roadway please use caution |
| | STATIONARY | |
| A | Police on roadway | Please yield right of way |
| B | Fire on roadway | Go right and stop |
| C | Ambulance Approaching | Proceed with caution |
| D | Ambulance on roadway | Slow down |
| E | | Stop now Stop now |
| F | | Accident ahead pass with caution |
| G | | Hazard on roadway please use caution |

In operation, a voice switch 211 directs the addressed voice segments to one or more of the transceiver 13, the transmitter 15 and the speaker 246, depending on the operating mode of the controller 31. For transmitting the voice segments via the transceiver 13, the switch 211 provides the analog signal to switch 70, which is controlled by the CPU 52 to provide the analog signal to the input of the transmitter 204. The carrier frequency $F_1$ analog is modulated by the audio frequencies of the analog voice messages in a conventional manner. From the transmitter 204, the modulated signal is processed by the amplifier 205, switch 112 and switch 206 in the same manner as previously described in connection with digital signals from the CPU 52 and EEPROM 203. The transmitter 204 of the transmitter 13 is keyed by the controller 31 via line 221.

Depending on the operating mode of the controller 31, the voice switch 211 may also direct the analog signals output by the analog memory 220 to the transmitter 15. Depending upon the selected operating mode, one or both of the transceiver 13 and transmitter 15 may be broadcasting audio signals. Also, each of the transceiver 13 and transmitter 15 may be broadcasting an audio message different from the other. As indicated in FIG. 5, the voice segments are delivered to a transmitter or modulator 212 in the transmitter 15, where the carrier frequency $F_0$ is modulated by the audio frequencies of the voice segments in a conventional fashion. Like the circuitry of the transceiver 13, the modulated output from the transmitter/modulator 212 is delivered to a variable power amplifier 213 for driving the antennas 19a and 19b. Like the variable power amplifier 205 of the transceiver 13, the variable power amplifier 213 of the transmitter 15 has a variable gain whose setting is controlled by the CPU 52 via the input/output circuitry 202 between minimum and maximum values. Also like the transceiver 13, a switch 214 is responsive to the CPU 52 to connect one or both of the antennas 19a and 19b to the power amplifier 213. Preferably, the audio message is repeatedly read from the analog memory 220 and broadcast by the transmitter 15.

With the analog or audio signal broadcast by the transmitter 15, an RBDS encoder signal is also transmitted on a sideband in accordance with the invention. In general, the format of the RBDS signal is in accordance with FIG. 6 and, in particular, is in accordance with the parameters for category 31 of the PTY code, which has been reserved for "emergency" functions. As described in the RBDS specification previously identified herein, digital data is encoded into an RBDS format in an encoder 215 of the transmitter 15. The RBDS encoded data is delivered to an amplitude modulator 216 for the purpose of modulating a subcarrier frequency provided by a generator 217. The output of the amplitude modulator 216 is the subcarrier from the generator 217 amplitude modulated in accordance with the RBDS data from the encoder 215. The modulated subcarrier signal is added to the analog signal from the analog memory 220 at summing circuit 218. The combined digital and analog signals are then modulated in a conventional fashion by transmitter 212.

Before the controller 31 terminates a transmission by the transmitter 15, an RBDS encoded signal is transmitted returning all of the captured receivers 17 to their previous mode of operation. The transmitter 15 is then keyed off by the controller 31 by applying the appropriate signal to the transmitter 212 via line 219. If the RBDS signal intended to terminate transmission is not received by the receiver 17, it will detect the loss of the transmission frequency $F_0$ and re-set after a time out.

The operator of the emergency vehicle may change the digital messages transmitted by the transmitter 15 and transceiver 13 by pressing the "mode" switch 75 on the control panel 33. By maintaining this momentary-type switch in its pressed position, the library of message choices contained in the EEPROM 203 scrolls across the display 55. When the switch 75 is released, the displayed alphanumeric message is selected for broadcast in the selected mode with any associated audio signal from the analog memory 220.

A custom voice audio signal may be recorded into the analog memory 220 at any time for later broadcast by the transceiver 13 and/or the transmitter 15. To record a voice signal, the operator presses the record/play switch 85 on the control panel 33 and the PTT switch 81 and speaks into the microphone 83. The CPU 52 responds to the activation of both switches by closing the microphone switch 209, which enables the analog input to the voice/message memory 220. The operator may review the recorded audio voice signal by pressing the record/play switch 85 after the PTT switch has been released. When the voice message is acceptable to the operator, the mode switch 75 is pressed, which identifies the message with the selected mode. Pressing the XMIT button 77 will then send the message. This message replaces any other message that was being sent in the present mode of the system. This new customized message will be repeated until the system is turned off or the controller 31 receives another input command.

The operator may broadcast a live message at any time. Pressing the "PTT" switch 81 transfers the system 11 to an operating mode that couples the microphone 83 directly to the transmitter 15. Specifically, the CPU 52 keys the transmitter 15 and provides it with an appropriate data signal for RBDS encoding, which is intended to capture control of the receiver 17. In order to ensure the user of the receiver 17 understands that an emergency voice message is being received, an alert tone is broadcast by the transmitter 15 prior to transmission of the voice message. To prompt the user of the system 11 as to when the system is ready to transmit a live message, the display 55 will display the word "TALK," indicating the alert tone has been sent and the voice channel is available. If the system 11 is in an operating mode when the PTT switch 81 is pressed, the controller 31 transfers to the mode for broadcasting the live message.

Figure 7:
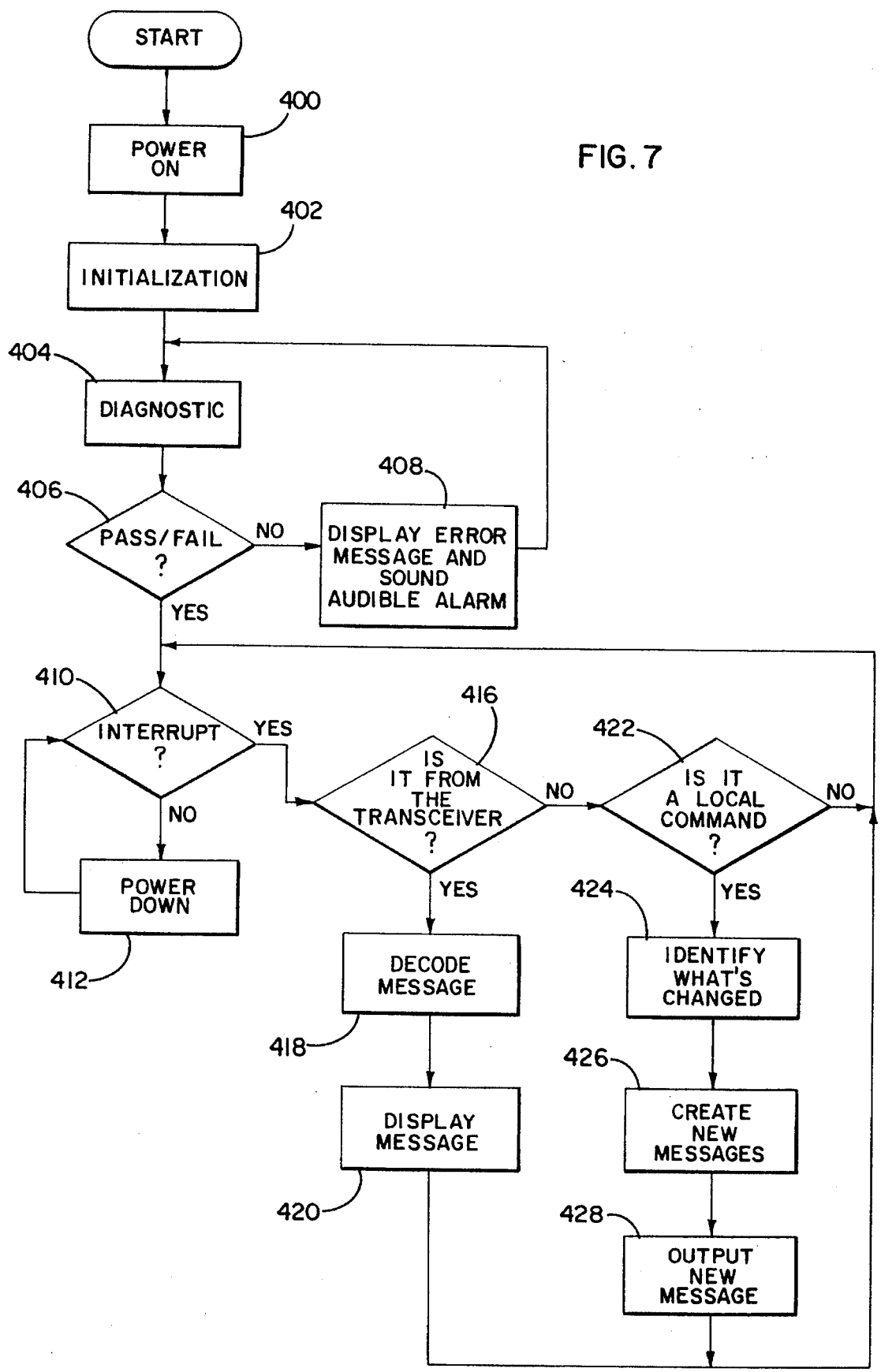
FIG. 7 is a logical flow diagram for operation of the transmitter and the transceiver of the RF system on one of the emergency vehicles shown in FIG. 1.

FIG. 7 is a logical flow diagram of the operation of the controller 31 as illustrated in FIG. 5. As shown therein, the CPU 52 is initially powered up at step 400 and performs a conventional initialization sequence (clears memory, loads program and the like) at step 402 that configures the hardware and software of the system. The CPU 52 then performs a diagnostic routine at step 404 that checks the operation of the system.

If the diagnostic routine detects a failure at step 406, the piezo alarm 87 sounds and an error message is displayed on the alphanumeric display 55 at step 408. The system is then halted. If the diagnostic routine passes at step 406, the CPU 52 then looks for an interrupt at step 410. If no interrupt is detected at step 410, the system 11 processes a power down mode at step 416 and waits for an interrupt.

After an interrupt is detected at step 410, the controller 31 checks first to see if it is a serial (remote) function, which is any information transmitted by another emergency vehicle. If this type of interrupt is detected at step 416, then the CPU 52 decodes the transmission at step 418 and provides the appropriate visual message at step 420 by doing one or all of the following: flashing the CAUTION lamp 89; sounding the piezo alarm 87; displaying information on the alphanumeric display 55; and, providing an audio message via speaker 246.

If the interrupt detected at step 416 is not from the transceiver 13, then the controller 31 evaluates the interrupt at step 422 as a "local" interrupt generated from the control panel 33, the sensors 231 or the audio/visual system 232. The CPU decodes this local interrupt at step 422, identifies what is changed at step 424, creates a new message at step 426 and executes the message or function at step 428. In one example, the interrupt may be generated by a change in the status of one of the sensors 231, foot switch 73 or the audio/visual system 232. In response to this change in status, the controller 31 may change modes to broadcast appropriate RF signals via transmitter 15 and transceiver 13. If the interrupt at step 410 is neither serial nor local, the resulting unknown interrupt is again presented to interrupt 410 for further processing. Once messages 420 or 428 are displayed or output, respectively, the controller 31 is returns to the step 410 for further processing.

Figure 8:
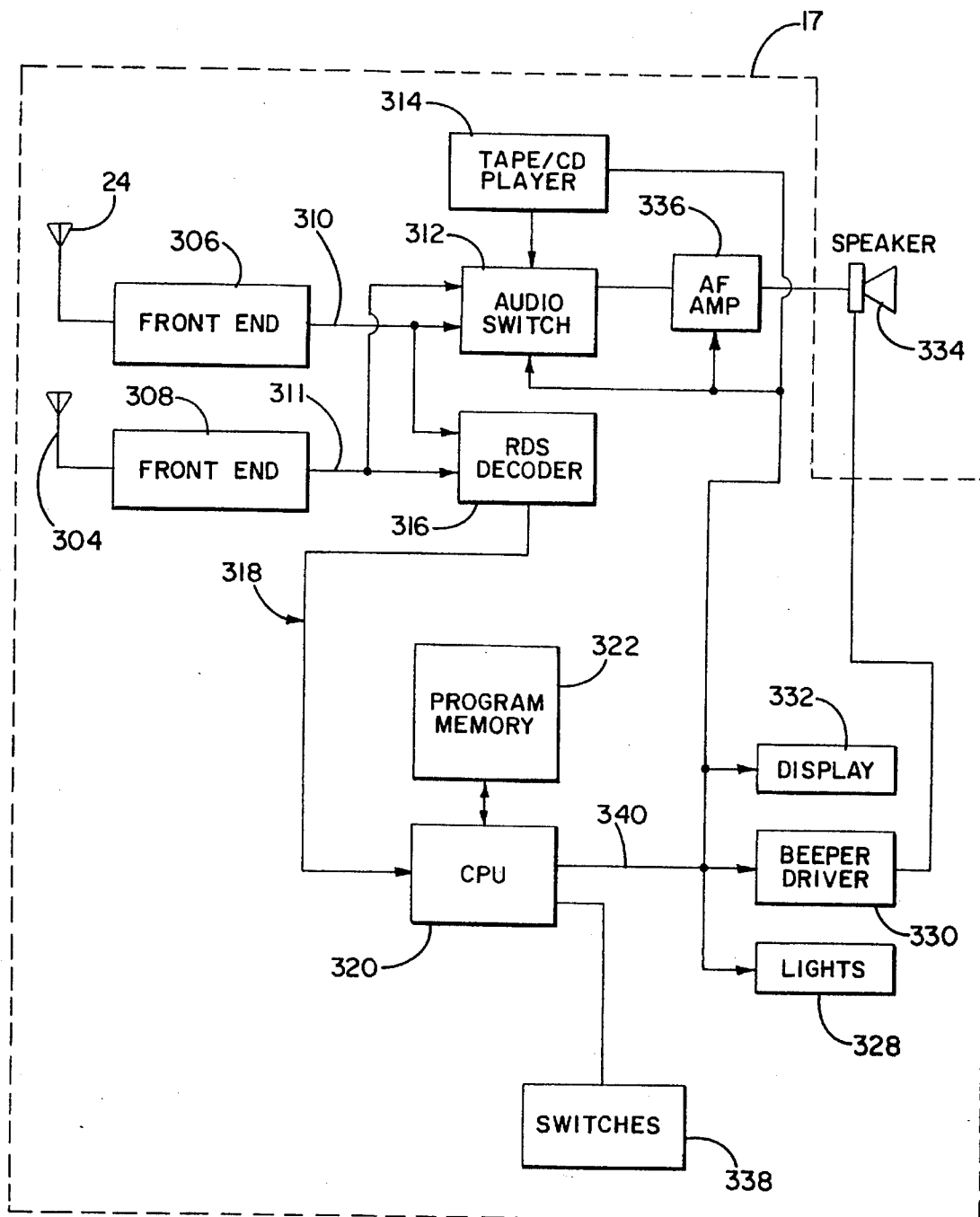
FIG. 8 illustrates a block diagram of a receiver for receiving commercial AM and FM broadcasts as well as the carrier frequency Fe transmitted by the transmitter in FIG. 1 and the control data of FIG. 6, the latter being transmitted by the transmitter on a sideband of the carrier frequency.

Turning to the block diagram of the receiver 17 in FIG. 8, the receiver 17 includes two front ends 306 and 308, each including a tuner and demodulator. The outputs 310 and 311 from each of the front ends 306 and 308, respectively, provide an audio frequency signal to an audio switch 312. In a conventional application, the receiver 17 has both front ends 306 and 308 tuned to the same radio frequency. Such a configuration is useful when, for example, the vehicle of the receiver 17 is stopped at a stoplight and the frequency to which the receiver is tuned becomes weak. This dual-front end configuration of the receiver 17 allows a CPU 320 to select the strongest signal from the two front ends 306 and 308 in order to maximize the strength of the signal. The invention advantageously utilizes the second front end 306 under the control of the CPU 320 to monitor for RBDS-type broadcasts. Upon receipt of emergency signals at the carrier frequency $F_0$ and its RBDS sideband, the CPU 320 performs the appropriate decoded function. This second front end 306 need not have its tuning fixed at the frequency $F_0$ in order for the receiver 17 to function in keeping with the invention. For example, the front end 306 may scan the FM band for specific sideband information. It is important to note that advances in technology could render the second front end obsolete; a simple front end with very fast scanning capabilities, or other RDS features may in the future enable use of only one front end to perform the functions of the two front ends 306 and 308.

The central processing unit or CPU 320 of the receiver 17 operates in a conventional fashion under the control of a program memory 322. In response to receipt of emergency RBDS data, the CPU 320 provides outputs to a display 332, beeper driver 330 and a CAUTION light 328. In addition, the CPU 320 controls an audio switch 312 and CD/tape player 314, which controls the audio signal input to an amplifier 336 and a speaker 334.

In normal operation, audio signals from a commercial transmitter are delivered to the audio switch 312 from one of the front ends 306 and 308. Commercial transmissions are handled as follows: All sideband data is decoded by decoder 316 and delivered to the CPU 320 via line 318 to be processed with the aid of program memory 322. Should the sideband data tell the CPU 320 to turn on lights 328, enable the beeper driver 330 or drive the display 332, those activities are performed. The listener will hear commercial broadcast over the speaker 334 and view the lights 328 and the display 332, as they respond to any sideband data. User control of the receiver 17 is achieved in a well-known manner by way of switches 338.

Should front end 306 receive a transmission on the frequency $F_0$ from the transmitter 15 of system 11, the decoder 316 decodes the emergency data from the sideband and presents it to the CPU 320 for processing. Under program control, the CPU recognizes the data as category 31 of the PTY code (i.e., emergency code) and reacts accordingly. Specifically, the CPU 320 switches the audio switch 312 from its present position (i.e., off, input from front end 308 or input from the tape/CD player 314) to an input from the front end 306, which is the demodulated audio emergency signal. The amplifier 336 is set by the CPU 320 to a level predetermined as best for broadcasting the audio emergency signal. Depending on the precise nature of the sideband data, the CPU 320 will also drive the display 332 to display information in a text format (e.g., "FIRE GO RIGHT," see FIG. 10), activate the beeper driver 330 and the lights 328. The beeper driver 330 provides a tone to the speaker 334, which may be used to announce transition of the receiver 17 to an emergency mode of operation. Once the receiver 17 is out of the range of the transmitter 15, the CPU controller 320 will return the system to the normal operating mode it was in prior to receiving the emergency signal.

Figure 9:
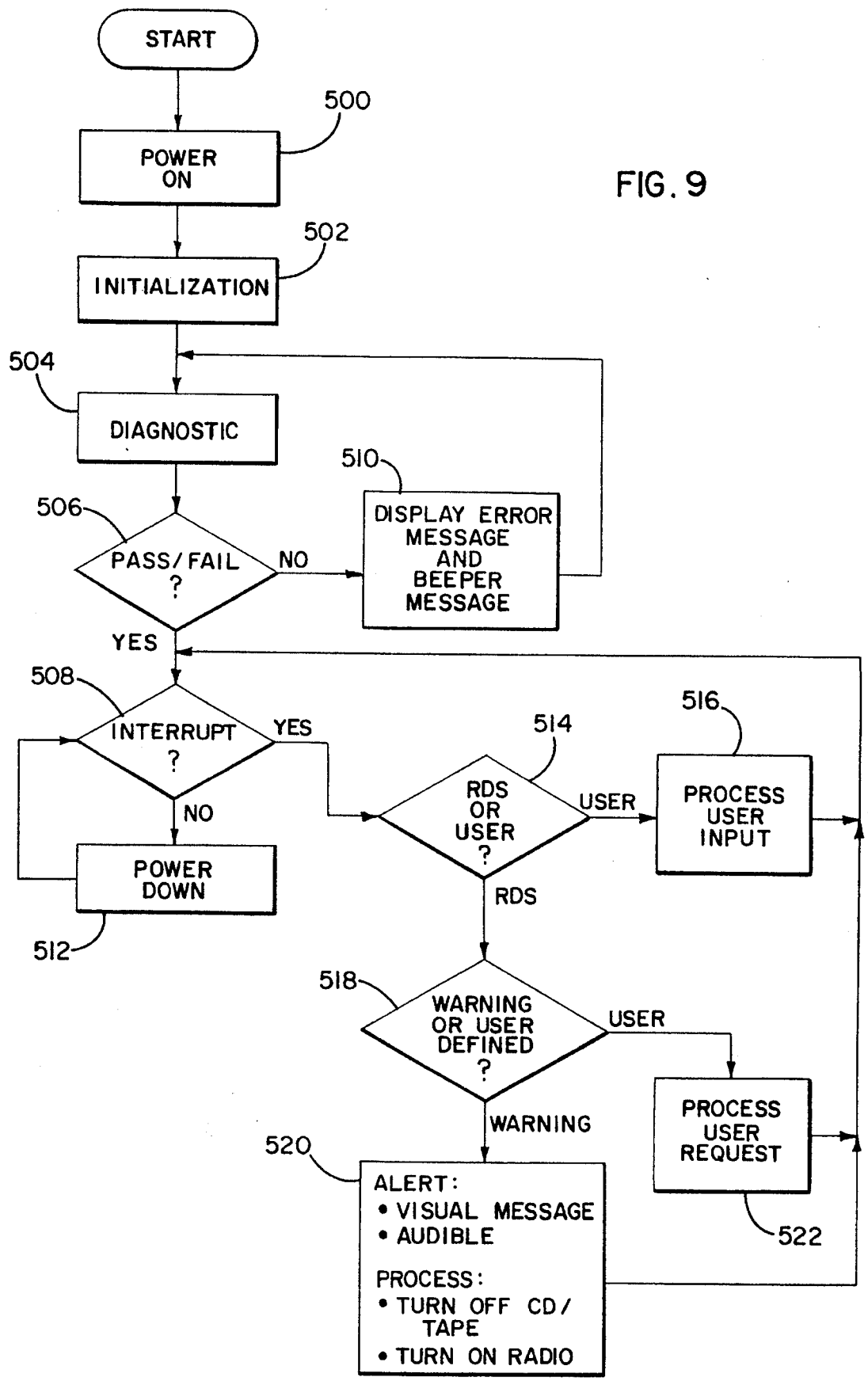
FIG. 9 is a logical flow diagram illustrating the operation of the receiver section of FIG. 8.

FIG. 9 is a logical flow diagram of the program in the program memory 322 of the receiver 17 shown in FIG. 8. The receiver 17 is initially powered up at step 500 and the CPU 320 performs an initialization sequence at step 502. In the sequence of step 502, the CPU 320 configures the hardware and software of the receiver 17 in a manner well understood by those skilled in the art. The CPU 320 then performs a diagnostic routine at step 504 that checks the operation of the system.

If the CPU 320 determines a failure has occurred at step 506, the beeper driver 330 is activated to sound an alarm and an error message is displayed on the alphanumeric display 332 at step 510. The CPU 320 then returns to step 504 and halts. On the other hand, if the diagnostic routine passes at step 506, the CPU 320 goes to step 508 and determines at step 514 whether an interrupt has been received. If no interrupt is detected at step 508, the CPU 320 advances to a power down mode at step 512 and loops through step 508 awaiting an interrupt.

When an interrupt is detected at step 508, the CPU 320 first determines at step 514 whether the interrupt is an interrupt related to operation of the receiver pursuant to the RBDS Standard or a user generated interrupt for such operations as changing volume or changing stations. If the interrupt detected is a signal from the front ends 306 or 308, the CPU 320 decodes the transmission at step 518 and determines whether the data is an emergency code according to the invention or a user defined code. A user-defined code may be a PTY code input from the RBDS switches 38 on the front panel 350 (see FIG. 10) asking the receiver 17 to search for a station having the same PTY code. If the decoded message is an emergency code (e.g., PTY code 31), the CPU 320 processes the warning signal at step 520. Specifically, the CPU 320 connects the front end 306 to the amplifier 336 by way of the audio switch 312. The CPU 320 also controls the display 332, the beeper driver 330 and the lights 328 as previously discussed in connection with FIG. 8. When the warning function is fully activated, the CPU 320 then branches back to step 508 and continues to look for an interrupt.

If the interrupt detected is not an RDS interrupt, the system processes the interrupt as a user function at step 516. If the interrupt detected by the CPU 320 at step 518 is a user-defined RBDS command, the CPU 320 advances to step 522 and processes the user request. The system then returns to step 508 and monitors for further interrupts.

From the foregoing detailed description, it will be appreciated that the alerting system 11 provides an effective broadcast area that complements the effective alerting area provided by conventional audio/visual systems such as the system 332 in the illustrated embodiment. By utilizing the RBDS Standard, conventional RBDS-compatible receivers such as receiver 17 can be remotely controlled by the alerting system 11 in order to enhance and complement the ability of the audio/visual system to alert everyone in the local area. Because the transmitter 15 broadcasts an RF emergency signal in accordance with the RBDS Standard, the recipient of the emergency signal need not possess special equipment in order to benefit from the enhancement provided by the alerting system 11. As suggested by the alternative embodiments illustrated in FIG. 3A through 3E, the alerting system 11 can be realized as several different architectures. In all of these architectures, however, the transmitter 15 complements an audio/visual system in order to control RBDS-compatible receivers in the approximate same local area as covered by the audio/visual system. Each and every patent and publication identified herein is hereby incorporated by reference.

We claim as our invention:

1. A system for broadcasting an emergency warning throughout an area about a site, the system comprising: a source at the site of an audible or visual warning signal detectable by at least one of the human senses; a transmitter at the site for broadcasting an electromagnetic warning signal within a tunable bandwidth of a standard radio receiver for receiving commercial broadcasts, with at least part of the electromagnetic warning signal encoded in an RDS compatible format; a power amplifier within the transmitter whose power rating provides an effective range of the electromagnetic warning signal that complements an effective range of the audible or visual signal and is approximately coextensive therewith; and, means for detecting the electromagnetic warning signal within is effective range and in response thereto tuning the receiver to a carrier frequency of the electromagnetic warning signal.

2. The system of claim 1 wherein the electromagnetic warning signal includes both the carrier frequency modulated by a signal within an audible frequency range and a sideband of the carrier frequency encoded in the RDS compatible format.

3. The system of claim 1 including an interface linking the source of the audible or visual warning signal and the transmitter to provide a timed relationship between a broadcasting of the audible or visual warning signal and the broadcasting of the electromagnetic warning signal.

4. The system of claim 3 wherein the timed relationship is a synchronized broadcasting of the audible or visual and electromagnetic warning signals.

5. The system of claim 1 including a variable gain control for controlling the power rating of the power amplifier in response to a vehicle operating parameter.

6. The system of claim 1 wherein the transmitter includes at least two antenna configurations responsive to a user control for selecting a particular shape of an effective broadcast area of the electromagnetic warning signal.

7. The system of claim 1 wherein the site of the source and transmitter is a mobile vehicle.

8. The system of claim 1 wherein the site of the source and transmitter is a fixed and stationary platform.

9. The system of claim 3 wherein the interface includes a user input for both actuating the source to broadcast the audible or visual warning signal and keying the transmitter to broadcast the electromagnetic warning signal.

10. The system of claim 1 wherein the tunable bandwidth is selected from the two bandwidths of 54 KHz to 160 KHz and 87.5 MHz to 108.0 MHz when the transmitter is broadcasting in the United States.

11. The system of claim 1 wherein the means for tuning the receiver includes circuitry responsive to electrical signals from a front end of the receiver.

12. The system of claim 5 wherein the vehicle operating parameter is speed.

13. A signalling system on-board an emergency vehicle for providing an advanced warning of the vehicle's approach, the system comprising: a transmitter for broadcasting a first emergency warning signal within a tunable bandwidth of a standard radio receiver for receiving commercial broadcasts; a transceiver for broadcasting or receiving a second emergency warning signal intended to provide an emergency vehicle-to-emergency vehicle link outside the tunable bandwidth of the standard radio receiver; source of the first and second emergency warning signals; and a processor responsive to an input at a user interface for keying the transceiver and the transmitter to broadcast the first and second emergency warning signals.

14. The signalling system of claim 13 wherein the first emergency warning signal includes control signals in an RDS compatible format, which are propagated by a sideband of a carrier frequency.

15. The signalling system of claim 14 wherein the transmitter includes a modulator for modulating the carrier frequency with an alerting signal in an audible range of frequencies.

16. The signalling system of claim 13 including a sensor on-board the vehicle for detecting a value of a parameter indicative of an operating status of the vehicle and providing a signal representing the value to the processor.

17. The signalling system of claim 16 wherein the second emergency warning signal broadcast by the transceiver includes information regarding the value of the parameter indicative of the vehicle's operating status.

18. An apparatus at a site interfaced to a system for broadcasting emergency warning signals from the site in the form of sound or light, the apparatus comprising: a controller for detecting a change in an operating status of the sound or light system; a transmitter responsive to the controller for transmitting (1) an RF carrier frequency $F_0$ modulated by an audio signal containing emergency information and (2) a sideband frequency of the carrier frequency $F_0$ modulated by RDS-encoded information.

19. The apparatus of claim 18 including a receiver for demodulating the modulated RF carrier frequency $F_0$ and the modulated sideband frequency, the receiver including means responsive to the RDS-encoded information in the sideband frequency for broadcasting the audio signal as an acoustic signal.

20. The apparatus of claim 18 wherein the site is a fixed and stationary site.

21. The apparatus of claim 1 wherein the site is a mobile vehicle.

22. A system for broadcasting an emergency warning throughout an area about a site, the system comprising: a source at the site of an audible or visual warning signal detectable by at least one of the human senses; a transmitter at the site for broadcasting an electromagnetic warning signal within a tunable bandwidth of a standard radio receiver for receiving commercial broadcasts, with at least part of the electromagnetic warning signal encoded in an RDS compatible format; a power amplifier within the transmitter whose power rating provides an effective range of the electromagnetic warning signal that complements an effective range of the audible or visual signal and is approximately coextensive therewith; and an interface linking the transmitter and the source of the audible or visual warning signal to provide a timed relationship between the broadcasting of the audible or visual warning signal and the broadcasting of the electromagnetic warning signal.

23. The system of claim 22 including a variable gain control for controlling the power rating of the power amplifier in response to an operating parameter of the site.

24. The system of claim 23 wherein the site is a vehicle and the operating parameter is speed.

25. A system for broadcasting an emergency warning throughout an area about a fixed and stationary site, the system comprising: a source of an audible or visual warning signal at the fixed and stationary site detectable by at least one of the human senses; a transmitter at the fixed and stationary site for broadcasting an electromagnetic warning signal within a tunable bandwidth of a standard radio receiver for receiving commercial broadcasts, with at least part of the electromagnetic warning signal encoded in an RDS compatible format; and, a power amplifier within the transmitter whose power rating provides an effective range of the electromagnetic warning signal that complements an effective range of the audible or visual signal and is approximately coextensive therewith.

26. The system of claim 25 including an interface linking the transmitter and the source of the audible or visual warning signal to provide a timed relationship between a broadcasting of the audible or visual warning signal and the broadcasting of the electromagnetic warning signal.

27. The system of claim 26 wherein the timed relationship is a synchronized broadcasting of the audible or visual warning signal and the electromagnetic warning signal.

28. The system of claim 26 wherein the interface includes a user input for both actuating the source to broadcast the audible or visual warning signal and keying the transmitter to broadcast the electromagnetic warning signal.

29. A system for broadcasting an emergency warning throughout an area about a site, the system comprising: a source at the site of an audible or visual warning signal detectable by at least one of the human senses; a transmitter at the site for broadcasting an electromagnetic warning signal within a tunable bandwidth of a standard radio receiver for receiving commercial broadcasts, with at least part of the electromagnetic warning signal encoded in an RDS compatible format; a power amplifier within the transmitter whose power rating provides an effective transmission area of the electromagnetic warning signal that complements an effective range of the audible or visual signal and is approximately coextensive therewith; and the transmitter including at least two antenna configurations responsive to a user control for selecting a particular shape of the transmission area.

30. A signalling system on-board an emergency vehicle for providing an advanced warning of the vehicle's approach, the system comprising: a transceiver for providing an emergency vehicle-to-emergency vehicle electromagnetic link; a transmitter for broadcasting an emergency warning signal to non-emergency vehicles within a tunable bandwidth of a standard radio receiver for receiving commercial broadcasts; a signal source for the transceiver and transmitter; and, a processor responsive to an input at a user interface for keying the transceiver and the transmitter to broadcast the emergency signals; and, a sensor on-board the vehicle for detecting a value of a parameter indicative of an operating status of the vehicle and providing a signal representing the value to the processor such that the emergency vehicle-to-emergency vehicle link includes information regarding the value of the parameter.

* * * * *